United States Patent
Demiryont et al.

[11] Patent Number: 6,040,939
[45] Date of Patent: Mar. 21, 2000

[54] ANTI-SOLAR AND LOW EMISSIVITY FUNCTIONING MULTI-LAYER COATINGS ON TRANSPARENT SUBSTRATES

[75] Inventors: Hüyla Demiryont, Philadelphia, Pa.; Hüseyin Parlar, Erenköy, Turkey; Ayse Ersoy, Sahrayicedid, Turkey; Ender Aktulga, Şaşkinbakkal, Turkey

[73] Assignee: Turkiye Sise ve cam Fabrikalari A.S., Istanbul, Turkey

[21] Appl. No.: 09/098,316

[22] Filed: Jun. 16, 1998

[51] Int. Cl.[7] .............. G02B 5/28; G02B 1/10; C03C 17/36; B05D 5/06

[52] U.S. Cl. .......... 359/360; 359/585; 359/588; 427/165

[58] Field of Search .............. 359/360, 585, 359/588, 590; 427/164, 165, 166

[56] References Cited

U.S. PATENT DOCUMENTS

| | | | |
|---|---|---|---|
| 3,990,784 | 11/1976 | Gelber | 350/166 |
| 4,368,945 | 1/1983 | Fujimori et al. | 359/360 |
| 4,889,414 | 12/1989 | Rauh et al. | |
| 4,902,081 | 2/1990 | Huffer | 350/1.7 |
| 4,976,503 | 12/1990 | Woodard | 359/360 |
| 5,034,246 | 7/1991 | Mance et al. | |
| 5,178,966 | 1/1993 | Gillery | 428/623 |
| 5,185,182 | 2/1993 | Brown | |
| 5,189,551 | 2/1993 | Woodard | |
| 5,253,101 | 10/1993 | Demiryont | |
| 5,417,827 | 5/1995 | Finley | 204/192.28 |
| 5,552,180 | 9/1996 | Finley et al. | 427/165 |
| 5,557,462 | 9/1996 | Hartig et al. | 359/585 |

FOREIGN PATENT DOCUMENTS

| | | |
|---|---|---|
| 0 104 870 A2 | 4/1984 | European Pat. Off. |
| 0 137 161 A2 | 4/1985 | European Pat. Off. |
| 0 204 061 A1 | 12/1986 | European Pat. Off. |
| 0 371 949 | 6/1990 | European Pat. Off. |
| 0 363 044 | 11/1990 | European Pat. Off. |
| 0 418 435 A1 | 3/1991 | European Pat. Off. |
| 0 511 044 A1 | 10/1992 | European Pat. Off. |
| 0 544 577 A1 | 6/1993 | European Pat. Off. |
| 0 567 735 A1 | 11/1993 | European Pat. Off. |
| 0 717 014 A1 | 6/1996 | European Pat. Off. |
| 0 719 876 A2 | 7/1996 | European Pat. Off. |
| 0 719 876 A3 | 7/1996 | European Pat. Off. |
| 0 722 099 A1 | 7/1996 | European Pat. Off. |
| 0 722 913 A1 | 7/1996 | European Pat. Off. |
| 0 728 711 A1 | 8/1996 | European Pat. Off. |
| 0 685 003 B1 | 10/1996 | European Pat. Off. |
| 0 736 736 A2 | 10/1996 | European Pat. Off. |
| 0 747 330 A1 | 12/1996 | European Pat. Off. |
| 0 771 766 A1 | 5/1997 | European Pat. Off. |
| 0 773 574 A1 | 5/1998 | European Pat. Off. |
| 96/37809 | 11/1996 | WIPO |

*Primary Examiner*—Jon Henry
*Attorney, Agent, or Firm*—Banner & Witcoff, Ltd.

[57] ABSTRACT

A coated article of manufacture comprises a substantially transparent substrate with a substantially transparent dual-function coating on a surface of the substrate. The coating provides low emissivity and high anti-solar performance properties. It comprises a first anti-reflection layer of dielectric material, preferably tungsten oxide. An infra-red reflective layer of silver metal overlies the anti-reflection dielectric layer. Optionally, a buffer layer is positioned between the anti-reflection layer and the infra-red reflective layer. Also, optionally, a color control layer may be positioned between the anti-reflection layer and the substrate. A silicon buffer layer, directly overlies the infra-red reflective layer of silver metal. A second anti-reflection layer of tungsten oxide overlies the buffer layer. In accordance with a method of manufacturing the coated article, each of the layers of the dual-function coating are deposited in turn by cathodic sputtering in a multi-station sputtering chamber. Passing the transparent substrate through the sputtering chamber a second time to produce a double-layer coating structure is found to provide especially high quality performance characteristics.

40 Claims, 11 Drawing Sheets

ND LOW EMISSIVITY
ANTI-SOLAR AND LOW EMISSIVITY FUNCTIONING MULTI-LAYER COATINGS ON TRANSPARENT SUBSTRATES

INTRODUCTION

The present invention is directed to transparent substrates having double functioning multi-layer coatings for low emissivity and anti-solar properties, as well as to methods of manufacturing such multi-layer coated articles. The invention relates, in particular, to anti-solar, low emissivity coatings on transparent substrates of glass or plastic material suitable especially for automotive and architectural applications.

BACKGROUND

Low emissivity coatings for transparent substrates, such as automotive and architectural glazing, are known to those skilled in the art. Likewise, coated glazing products having anti-solar properties, that is, low transmittance of wavelengths in the infra-red range, also are known to those skilled in the art. Low emissivity coatings for glazing products are disclosed, for example, in European patent application 0,104,870 to F. H. Hart entitled *Low Emissivity Coatings On Transparent Substrates*. That document discloses low emissivity silver coatings comprising a layer of silver and an overlying anti-reflective layer of metal oxide. Cathodic sputtering is disclosed for producing such low emissivity coatings having a small amount of an additional metal dispersed non-uniformly in the silver layer. Sputtered deposition of a multi layer low emissivity coating is described, for example, in European Patent Application 0,418,435 to Nalepka. Similarly, a multi-layer low emissivity coating is disclosed in European patent application 0,418,435 to Hayward et al. The multi-layer coating of Hayward et al. is said to comprise a layer of sputtered zinc, tin, titanium, indium/tin or bismuth oxide, next a layer of sputtered silver or silver alloy, then a layer sputtered titanium or stainless steel and finally a layer of zinc, tin, titanium, indium/tin or bismuth oxide. Such multi-layer film is said to have excellent visible light transmission while controlling both near infra-red solar energy and far infra-red reflected energy. A temperable coated article is suggested in U.S. Pat. No. 5,552,180 to Finley et al. The coated article of Finley et al. employs a metal-containing film such as titanium nitride which ordinarily oxidizes at the high temperatures encountered during glass tempering, along with an overcoating of a protective layer of a silicon compound and an undercoating with a stabilizing metal-containing layer. In U.S. Pat. No. 3,990,784 to Gelber a multi-layer coating for architectural glass is suggested, comprising first and second metal layers with a dielectric layer disposed between them. Gelber suggests that the transmission properties of the coating can be changed independent of its reflection properties, by varying the thickness of the metal layers while maintaining the ratio of their thicknesses constant.

In general, conventional low emissivity coating systems employ a first dielectric film or layer directly on a surface of a transparent substrate, followed by metal film and then a second dielectric film over the metal film. Where the metal film employs silver or other easily oxidized metal, a buffer film typically is positioned between the metal and the second dielectric films. The buffer film substantially inhibits migration to the metal film of oxygen or other reactive gas employed in the deposition of the second dielectric film. Conventional dielectric materials include, for example, oxides such as zinc oxide, tin oxide, zinc/tin oxide composites, indium/tin oxide, bismuth oxide, titanium oxide, etc., and nitrides such as tin nitride. The metal layer frequently employs silver, although other metal layers also are known to those skilled in the art. Suitable buffer layers for protecting a silver or other metal film have typically been, for example, a sub-oxide of chrome or chrome/nickel or nitride of silicon or titanium film 100Å to 120Å thick. The thickness of the metal film is selected to provide adequately low emissivity while maintaining sufficiently high transmittance of visible light to meet the requirements of the intended application. The thickness of the bottom and top dielectric films is selected typically to achieve adequate anti-reflectance for the metal film, whereby the entire multi-layer coating has improved transparency to visible light.

Various difficulties have been encountered by those skilled in the art in developing commercially suitable coatings for architectural and automotive glazing. In particular, it has proved difficult to achieve low emissivity coatings which also provide good attenuation of direct solar radiation, that is, good anti-solar properties. There has long been need in the glazing industry for coating systems which can be uniformly deposited by sputtering onto large surface areas with fast deposition rates, low deposition power density, good film quality, including high film durability, bulk or near bulk density, and long shelf life. As used here, large area deposition refers to deposition onto transparent substrates suitable in size for architectural and automotive glazing applications. Fast deposition rate is desirable, since it can reduce the time and cost of producing the coated articles. Long lasting source material to deposit reproducible films is desirable. Low deposition power density is desirable both to reduce the cost of energy employed in manufacturing the coated article and to provide more uniform coating thickness and density. The reference here to a multi-layer coating having long shelf life is intended to mean, especially, that the coated surface can be exposed to air for hours or even days without substantial degradation of film quality, for example, due to migration of oxygen or moisture from the air into the coating to react with the coating materials. In that regard, substantial manufacturing process complexity and production wastage occurs when the sputtered multi-layer coating on a glazing panel deteriorates significantly if it is not immediately laminated or otherwise assembled into a multi-pane window which protects the coating from exposure to air. Increasing the time period during which a coated glazing panel can be stored prior to being laminated or assembled in this fashion provides significant production flexibility with consequent reduction in processing cost and complexity. Easily degrading deposition sources increases the production costs. Large area processable materials/processes are also desirable.

It is an object of the present invention to provide coated articles meeting some or all of these long-felt industry needs. In particular, it is an object of at least certain preferred embodiments of the invention to provide coated articles of manufacture comprising a substantially transparent substrate with a substantially transparent coating of the surface of the substrate, which coating has high film durability, bulk or near bulk density and long shelf life.

It is a particular object of the invention to provide coated articles comprising a transparent substrate having a double functioning multi-layer coating on at least one surface of the substrate. Such coating providing both low emissivity and anti-solar performance characteristics. In accordance with certain preferred embodiments, it is a further object to provide glazing units and electrically conductive panels.

It is a further object of the invention to provide methods of manufacturing the aforesaid coated articles.

Additional objects and advantages of the present invention will be readily understood by those skilled in the art given the benefit of the following disclosure of the invention and detailed description of preferred embodiments.

SUMMARY

In accordance with a first aspect of the invention, a coated article of manufacture comprises a substantially transparent substrate with a substantially transparent dual-function coating on a surface of the substrate. The substantially transparent coating comprises a first anti-reflection layer of dielectric material overlying the surface of the substrate. Preferably anti-reflection layer is directly on the surface of the substrate. As used here and in the appended claims, any particular layer of the substantially transparent, multi-layer coating is said to be "directly" on or to "directly overlie" the substrate or another layer of the coating if no other layer of the coating is positioned between them. In this regard, any particular layer of the coating may be said to lie directly on another layer of the coating notwithstanding that there may be a slight transition zone between the two layers involving migration of the material of one layer into the other and/or interlayer reaction products different from the primary composition of the layers. An infra-red reflective layer of silver metal overlies the anti-reflection layer. A buffer layer directly overlies the infra-red reflective layer of silver. Finally, a second anti-reflection layer of tungsten oxide overlies the buffer layer. Preferably the first anti-reflection layer of dielectric material is tungsten oxide. The buffer layer preferably comprises silicon, silicon nitride or tungsten nitride and is referred to here as the silicon buffer layer. As explained above, however, it will be recognized that a silicon buffer layer typically would comprise silica, that is silicon oxide, at the interface with the overlying tungsten oxide anti-reflection layer. This is because silicon in the buffer layer would be exposed to oxygen in the reactive atmosphere employed for sputter deposition of the overlying tungsten oxide anti-reflection layer. At its exposed surface, the silicon would react with such oxygen, forming a transition zone of silicon oxide adjacent the tungsten oxide layer.

In accordance with a second aspect of the invention, methods are are provided for making the coated article disclosed above. Such methods comprise providing a substantially transparent substrate, typically with appropriate surface preparation steps being performed on the surface to be coated. The multi-layer, low emissivity, anti-solar coating is then formed on the surface of the substrate. The first anti-reflection layer of dielectric material is deposited, followed by the silver metal infra-red reflective layer over the anti-reflection layer. The silicon buffer layer is then deposited directly onto the infra-red reflective layer and, subsequently, a tungsten oxide layer is deposited over the buffer layer to form a second anti-reflection layer. In accordance with preferred embodiments, each of the layers of the substantially transparent coating is deposited by sputtering in a series of sputter stations arranged sequentially in a single sputtering chamber through which the transparent substrate passes at constant travel speed. Suitable partitions, such as curtains or the like, separate one sputter station from the next within the sputtering chamber, such that different deposition atmospheres can be employed at different stations. A reactive atmosphere comprising nitrogen or oxygen or both can be used, for example, at a first station to deposit a tungsten oxide anti-reflection layer, followed by a non-reactive atmosphere consisting essentially of argon or other suitable inert gas at a subsequent station for depositing the silver metal layer.

In accordance with certain highly preferred embodiments of the manufacturing method disclosed here, the substantially transparent dual-functions disclosed here coating is deposited by multiple passes, preferably two passes through such multi-station sputtering chamber. During each of the passes through the sputtering chamber, a multi-layer coating is deposited comprising the aforesaid first anti-reflection layer, silver metal layer, silicon buffer layer and tungsten oxide second anti-reflection layer. Thus, the coating in accordance with such preferred embodiments may comprise at least eight individual layers. Dual-function coatings formed in accordance with such multi-pass methods of the invention are found to have substantially improved coating properties, including especially color uniformity.

It will be apparent to those skilled in the art in view of the present disclosure, that the present invention is a significant technological advance. Preferred embodiments of the substantially transparent dual-function coatings disclosed here have excellent performance characteristics, including advantageously low emissivity and advantageously high anti-solar properties, that is, high attenuation levels of direct solar radiation. Employing the above disclosed tungsten oxide anti-reflection coating with the silver metal infra-red reflective layer, along with the silicon buffer layer between them formed of silicon oxide, silicon nitride or tungsten nitride, results in novel multi-layer coatings which are highly suitable for large area deposition by sputtering. Fast deposition rates can be obtained with these materials, even employing advantageously low deposition power densities. The resulting coating has high durability, bulk or near bulk density and long shelf life. It is particularly advantageous that the tungsten oxide layer can be formed by reactive sputtering from a pure tungsten target with little or no target poisoning. The resulting tungsten oxide layer has a high refractive index (approximately 2.2 in the visible spectrum). This refractive index is comparable to that of bismuth oxide previously employed for anti-reflection films in low emissivity coatings. As is known, however, a bismuth target is quite brittle, so deposition of bismuth oxide is quite difficult In contrast, the tungsten oxide anti-reflection layers of the low emissivity coatings disclosed here provide desired spectral performance characteristics at thicknesses less than that required for other known oxides such as tin oxide and zinc oxide. Zinc oxide (ZnO) forms soft and weak films. Tin oxide forms yellowish colored coatings and tin targets frequently exhibit arching problems because of target poisoning. Thus, deposition of the tungsten oxide anti-reflection layer employed in the coatings disclosed here can be accomplished in less time. As noted above, faster production speeds can yield corresponding reductions in production costs. Also, anti-reflection films formed of prior known materials, such as tin oxide, indium/tin oxide or zinc oxide would typically require thicknesses of 400Å or more to provide performance characteristics comparable to those achieved by a 300Å tungsten oxide layer in the dual-function coatings disclosed here. In comparison to tungsten oxide anti-reflection films, tin oxide deposits 3–4 times slower than tungsten oxide, resulting in substantial production cost penalties. Zinc oxide, although having relatively fast deposition speeds, exhibits poor adhesion to glass substrates and is disadvantageously unstable upon exposure to UV radiation. In addition, the high density of the tungsten oxide anti-reflection layer employed in the dual-function coatings disclosed here, which is found to be as high as bulk value or nearly bulk value, results in excellent protection for the underlying buffer and metal layers. This results in advantageously long shelf life for the coated articles disclosed here.

In addition, the tungsten oxide anti-reflection layer has advantageously low absorption coefficient in the visible and infra-red regions, together advantageously high refractive index. Thus, in short, the tungsten oxide anti-reflection layer of the dual-function coatings disclosed here has advantageous spectral properties, robust deposition properties and excellent mechanical film properties.

The aforesaid advantageous properties of the tungsten oxide anti-reflection layer of the dual-function coated articles are realized in conjunction with the use of a silicon buffer layer and a silver metal infra-red reflective layer, specifically, a buffer layer formed of silicon, silicon oxide, silicon nitride or tungsten nitride. Silicon is found to provide a highly effective protective layer over the silver metal layer to prevent oxidation of the silver metal during deposition of the tungsten oxide anti-reflection layer. Silicon buffer layers having a thickness of only 20Å to 25Å are found to provide excellent protection against oxidation of the underlying silver metal film. Without wishing to be bound by theory, it is presently understood that the native oxide of the silicon layer is approximately 10Å to 15Å thick and highly transparent to visible light. The silicon layer can be deposited by sputter deposition employing process parameters well-matched to those employed for subsequent sputtering of tungsten to form the anti-reflection layer. Increasing the silicon buffer layer thickness to 50Å is found to provide excellent protection for the underlying silver metal layer even upon exposure to air for six months or more and even if higher power density levels are employed for depositing the tungsten oxide layer. In accordance with certain preferred embodiments, a thicker silicon buffer layer is employed when higher deposition power levels are to be used for depositing a subsequent tungsten oxide film. Silicon buffer layer thicknesses of, for example, 50Å are preferred in such embodiments, if an overlying tungsten oxide layer is to be sputtered at energy levels of 0.5 Watts/cm$^2$ or higher. While not wishing to be bound by theory, it presently is understood that the higher sputtered deposition energy levels can cause oxygen in the reactive atmosphere employed to produce the tungsten oxide layer deeper into, and possibly through, the silicon buffer layer to the underlying silver metal infra-red reflective layer. The increased silicon buffer layer thicknesses reduce or eliminate this effect.

Additional features and advantages of the various embodiments of the present invention will be further understood in view of the following detailed description of certain preferred embodiments.

BRIEF DESCRIPTION OF THE DRAWINGS

Various preferred embodiments of the coated article of manufacture and method of manufacture disclosed above are discussed below with reference to the appended drawing in which.

It should be understood that the schematic illustrations in FIGS. 1–3 and 8 are not necessarily to scale. In particular, the thickness of the various individual layers forming the substantially transparent multi-function coating are increased relative the thickness of the substrate for the purpose of clarity and ease of illustration.

DETAILED DESCRIPTION OF CERTAIN PREFERRED EMBODIMENTS

It will be apparent to those skilled in the art, given the above disclosure and the following detailed description, that the coated articles disclosed here, comprising a substantially transparent substrate carrying a substantially transparent dual-function coating have numerous commercially significant applications. Coated articles in accordance with certain preferred embodiments are suitable for use as substantially transparent, electrically conductive panels. Such panels have application, for example, in electrochromic devices, such as display devices and glazing units adapted to switch between transparency and opacity upon application and removal of an electric charge to electochromic material in contact with the electrically conductive panel. For ease of discussion, the following detailed description of certain preferred embodiments will focus primarily on articles suitable for automotive or architectural glazing applications. It will be within the ability of those skilled in the art, given the above disclosure and this detailed description, to employ the invention in alternative applications.

Figure 1:
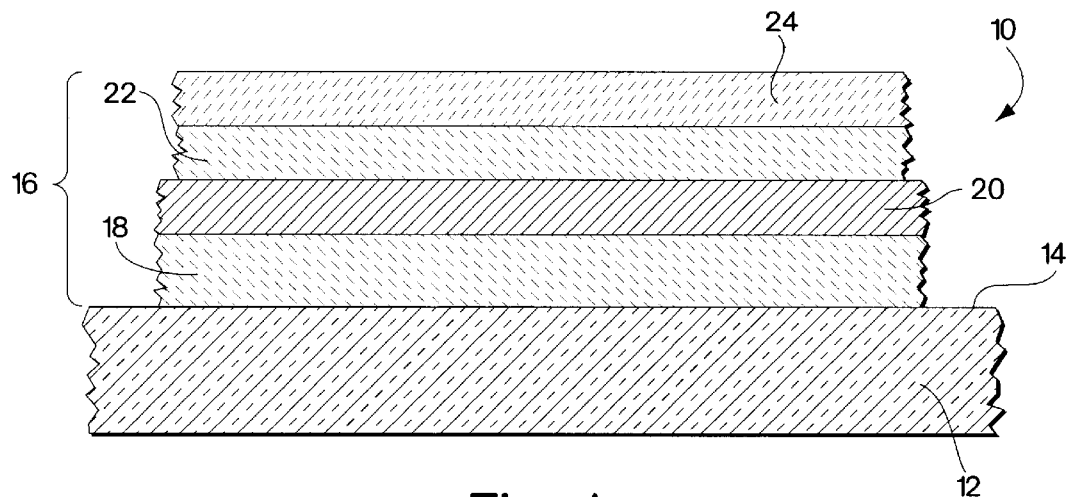
FIG. 1 is a schematic cross-sectional view of a coated article of manufacture according to a first preferred embodiment.

Referring now to FIG. 1, a coated article 10 is seen to comprise a substantially transparent substrate 12 having a main surface 14 carrying a dual-function coating 16. Coating 16 is dual-function in accordance with the above disclosure, that is, it provides both low emissivity and anti-solar performance characteristics for the coated article. Coating 16 includes a first anti-reflection layer 18 directly on the surface 14. Numerous suitable materials for anti-reflection layer 18 will be apparent to those skilled in the art given the benefit of this disclosure. Most preferably anti-reflection layer 18 is formed of tungsten oxide. It should be understood that all references here and in the appended claims to the tungsten oxide, unless otherwise clear from the context of any particular instance of its use, are intended to mean $WO_3$ and/or another oxide of tungsten, $WO_x$, where x can vary from about 2.5 to about 2.99. Also, reference to $WO_3$ should be understood to mean, in the alternative, $WO_x$ unless otherwise clear from context. $WO_x$ where x is less than 3 is a blue oxide. The substantially transparent area coating of the present invention which employ such blue oxide in sufficient film thickness will have a bluish tint or coloration. In general, thicker $WO_x$ films will result in more coloration of the coated article. Silver metal layer 20 lies directly on anti-reflection layer 18. It will be within the ability of those skilled in the art, given the benefit of this disclosure, to determine a thickness for silver metal layer 20 adapted to the intended application of the coated article. Silver metal layers of greater thickness will provide enhanced infra-red reflectivity, while thinner silver metal layers will provide increased transmittance of light in the visible wavelength range. In accordance with certain preferred embodiments, the silver metal layer has a thickness between 80Å and 160Å, more preferably between 90Å and 150Å.

Buffer layer 22 directly overlies silver metal layer 20. As noted above, the buffer layer most preferably is formed of silicon for excellent protection of the underlying silver metal layer. Without wishing to be bound by theory, it is presently understood that the silicone layer will include native oxide of silicon to a certain depth, for example, about 10Å to 15Å, at the interface with the overlying anti-reflection layer 24 of tungsten oxide. In addition, the buffer layer may be formed of silicon nitride, tungsten nitride or a mixture of any of these materials. The silicon buffer layer preferably has a thickness less than 75Å, more preferably about 20Å to 50Å, most typically about 25Å to 40Å.

The overlying anti-reflection film 24 comprises tungsten oxide in accordance with the foregoing disclosure. As already discussed, the tungsten oxide layer can be formed by sputter deposition of tungsten in an oxygen atmosphere, resulting in a high density layer, specifically, a layer having density as high as bulk value. The resultant excellent mechanical film properties, including low moisture absorption, along with the excellent spectral properties of the tungsten oxide anti-reflection layer, including low absorption coefficient in the visible and infra-red regions along with high refractive index, contribute significantly to the unexpected overall efficacy and advantages of the present invention. In preferred embodiments intended for architectural or automotive glazing applications, the tungsten oxide anti-reflection layer 24 preferably has a thickness of about 300Å to 450Å. The first anti-reflection film 18, when formed of tungsten oxide, preferably has a thickness also within the range about 300Å to 450Å. Preferably the thickness of the first anti-reflection layer formed of tungsten oxide is from about zero percent (0%) to ten percent (10%), more preferably three percent (3%) to seven percent (7%), less than the thickness of the second anti-reflection layer 24.

As noted above, it will be within the ability of those skilled in the art, given the benefit of the present disclosure and detailed description of various preferred embodiments, to select thicknesses for the individual layers of the dual-function coating adapted to meet the particular performance characteristics needed for a particular intended application.

Figure 2:
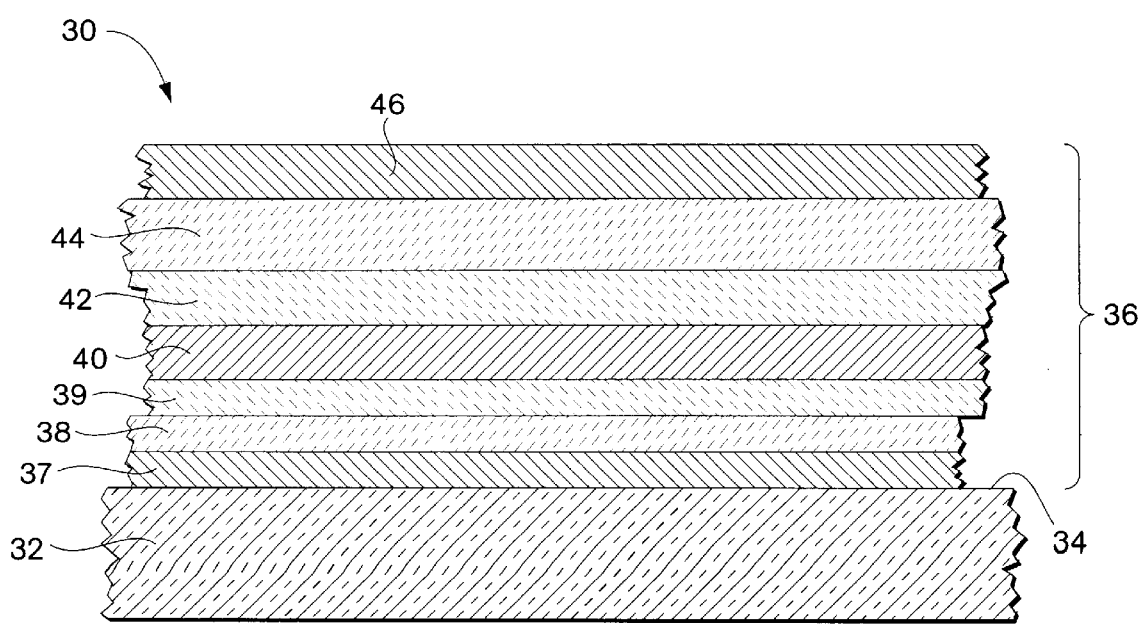
FIG. 2 is a schematic cross-sectional view of a second preferred embodiment.

An alternative preferred embodiment of the coated articles disclosed here is illustrated in FIG. 2, having a substantially transparent substrate 32. A substantially transparent dual-function coating 36 is carried on surface 34 of substrate 32. In coating 36, first anti-reflection layer 38 overlying the substrate does not lie directly on surface 34 of substrate 32. Rather, a color control layer 37 lies directly on surface 34 and directly under anti-reflection layer 38. The color control layer preferably has a thickness less than 50Å and is formed preferably of silicon or tungsten metal. It will be within the ability of those skilled in the art, given the benefit of this disclosure, to select a suitable material and thickness for the color control layer to achieve both enhanced uniformity and desired hue or color of the coated article. Reference here to uniformity of color refers to reduction in blotchiness or the like which may otherwise appear in a coated article.

The anti-reflection layer 38 in coating 36 of coated article 30 is comparable to anti-reflection layer 18 in the embodiment of FIG. 1. Directly overlying anti-reflection layer 38 is an inner buffer layer 39, preferably comprising silicon. Silver metal layer 40 in the embodiment of FIG. 2 corresponds generally to silver metal layer 20 in the embodiment of FIG. 1. Similarly, silicon buffer layer 42 corresponds generally to buffer layer 22 in the embodiment of FIG. 1. It will be within the ability of those skilled in the art to select a suitable thickness for silicon buffer layer 39, in conjunction with selection of the thickness of silicon buffer layer 42, to provide good protection for the silver metal layer 40 within the constraints of meeting spectral performance requirements in the finished article. Tungsten oxide anti-reflection film 44 in the embodiment of FIG. 2 corresponds generally to tungsten oxide anti-reflection layer 24 in the embodiment of FIG. 1. The thickness of the outer anti-reflection layer, that is, anti-reflection layer 24 in FIG. 1 and 44 in FIG. 2, is selected to provide, in conjunction with the other layers of the coating, suitably low reflectance of visible light, with reflectance color preferably being neutral or between the bluish and pinkish reflectance characteristics. A metal protection layer 46 directly overlies anti-reflection layer 44.

In accordance with certain preferred embodiments, the coated article 30 is subjected to a tempering step subsequent to deposition of the coating 36. Metal protection layer 46 advantageously protects underlying layers of the coating 36 during exposure to the high temperatures required for tempering a glass substrate such as a soda-lime-silica glass substrate intended for architectural or automotive applications. Preferably, metal protection layer 46 is formed of silicon or silicon nitride or tungsten metal. A second metal protection layer can be employed, being positioned preferably as the first layer of the multi-layer coating directly on the substrate surface. Such first metal protection layer directly on the surface of the substrate is formed of silicon or silicon nitride or tungsten metal and has a thickness in the range 40Å to 100Å, for example, 50Å to 80Å, more preferably about 50Å to 70Å. Similarly, the thickness of metal protection layer 46 shown in FIG. 2 on the outer surface of the coating 36 (being the upper surface as viewed in FIG. 2) preferably is between about 100Å and 600Å, more preferably between 200Å and 500Å.

Figure 3:
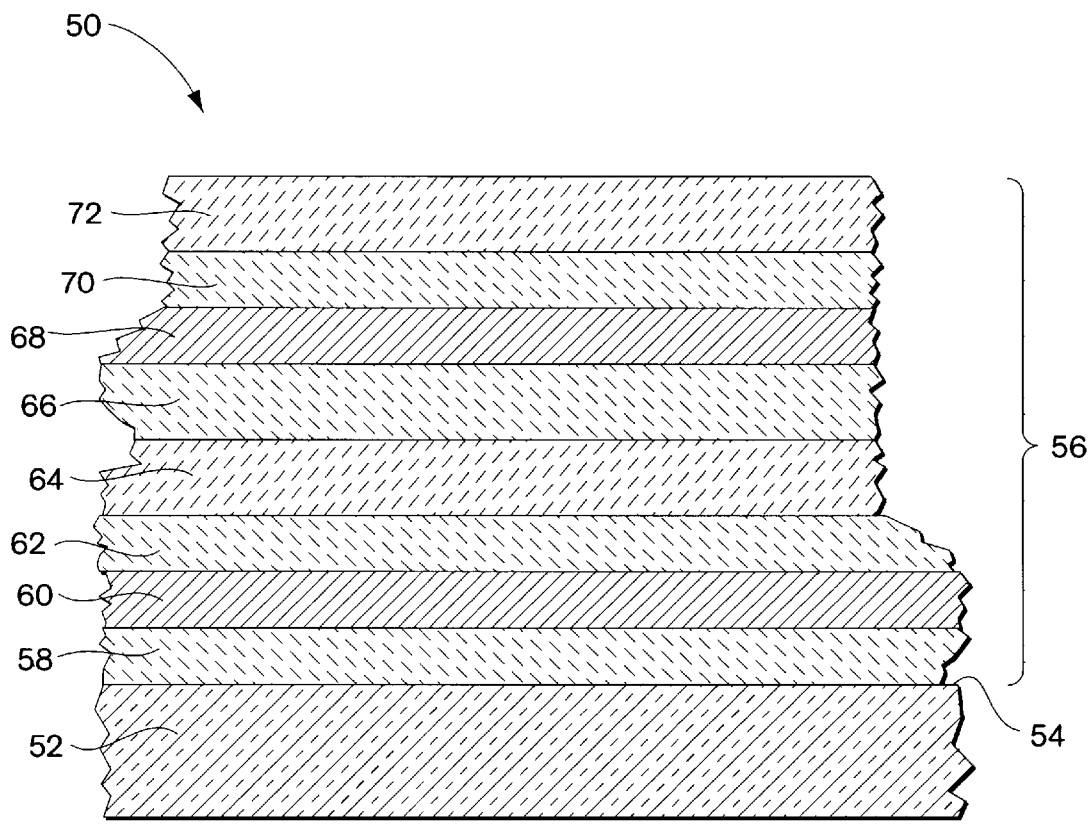
FIG. 3 is a schematic cross-sectional view of a third preferred embodiment.

In accordance with certain preferred embodiments the dual-function coating disclosed here for a substantially transparent article of manufacture has a double or repeating structure. More specifically, in accordance with such preferred embodiments, the coating comprises of first series of layers, including the aforesaid anti-reflection layer, silver metal layer, silicon buffer layer and second anti-reflection layer, followed by a second such series of layers. Thus, a coating in accordance with such double-layer structure would have eight layers. Referring now to FIG. 3, a coated article of manufacture 50 is seen to comprise a substrate 52 having a surface 54 carrying double-layer structure, dual-function coating 56. Coating 56 includes a first anti-reflection layer 58 directly on surface 54, followed by infra-red reflective layer 60 of silver metal. Silicon buffer layer 62 lies directly on layer 60, followed second anti-reflection layer 64 of tungsten oxide. Third anti-reflection layer 66 of tungsten oxide directly overlies second anti-reflection layer 64. In this regard, it is recognized that tungsten oxide layers 64 and 66 may alternatively be considered to be one combined double thickness layer of tungsten oxide. Second infra-red reflection layer 68 of silver metal lies directly on tungsten oxide layer 66 and is followed directly by second silicon buffer layer 70. Finally, fourth anti-reflection layer 72 of tungsten oxide directly overlies silicon buffer layer 70. It will be recognized by those skilled in the art that in alternative embodiments color control layer(s) and/or metal protection layer(s) may be employed in a double-layer structure, such as in FIG. 2, in accordance with the principles disclosed above regarding those optional additional layers. In general, the layer thicknesses in a double-layer structure, such as that of FIG. 3, are the same as for a single-layer structure. (See Example 4 below.) It will be within the ability of those skilled in the art, given the benefit of this disclosure, to select suitable thicknesses for each of the layers of a single or double-layer structure embodiment, such as the double-layer structure of FIG. 3, in accordance with the general principles disclosed here, to meet the performance characteristics needed for the intended application of the coded article.

Preferred embodiments of the coated articles disclosed here can be prepared in accordance with various suitable techniques employing commercially available equipment and materials. Preferably, the substantially transparent dual-function coating is formed on the surface of the substantially transparent substrate by cathodic sputtering. In accordance with certain preferred embodiments, a coated article is manufactured by depositing each of the layers of the coating in sequence. Preferably, each of the layers is deposited in turn as the substrate travels continuously through a multi-station sputtering chamber. Thus, in manufacturing the embodiment of FIG. 1, for example, as the substrate passes through a first sputtering station within such multi-station chamber, the first anti-reflection layer of dielectric material is deposited by cathodic planar sputtering onto the surface of the substrate. Depending on the substrate travel speed, deposition parameters, and the thickness of the anti-reflection layer, one, two or more sputtering stations can be used to deposit the same coating material. In this way, one can achieve shorter deposition cycle time. After having received the first anti-reflection layer onto its surface, the infrared reflective layer of silver metal is then deposited by the cathodic sputtering as the substrate passes through a subsequent station of the multi-station chamber. The silicon buffer layer is deposited at a subsequent station within the chamber, and then the second anti-reflection layer is deposited on a subsequent station. Preferably, the substrate moves continuously through the chamber, such that the individual layers are deposited onto the substrate as it is traveling. The individual stations are sufficiently isolated by curtains or other suitable partition means, such that the reactive atmosphere employed at a first sputtering station does not contaminate the non-reactive atmosphere employed at an adjacent station. In this regard, where less than all stations of a multi-station deposition chamber are to be employed, for example, where an eight-station chamber is to be used to deposit a four-layer coating, a station can be left unused between one employing a reactive atmosphere and another employing a non-reactive atmosphere to achieve better isolation. Suitable multi-station sputter deposition chambers are commercially available, including pilot plant size coaters, for example, Model Z600 from Balzers Process System GmbH, D-63755, Alzenau, Germany, and full commercial scale coaters, for example, Interpane 1993 model Coater available from Interpane Glass Industrie AG, Sohnr Eystasse 2137697 Lauenförde, Germany. Table A gives the typical process parameters for Model Z600 pilot plant coater and for an Interpane 1993 Model production coater.

| Parameters | Z600 | Interpane |
| --- | --- | --- |
| Maximum Substrate Dimensions, cm | 40 × 50 | 600 × 300 |
| Background Pressure, mbar ($10^{-5}$) | 5 | 5 |
| Power Density (Watt/cm$^2$) | 0.2–5 | 0.2–5 |
| Working Pressure, mbar ($10^{-3}$) | 1.5–4 | 2–7 |
| Argon, sccm | sputter | sputter |
| Oxygen, sccm | reactive | reactive |
| Nitrogen, sccm | reactive | reactive |

Advantageously, such preferred multi-station sputtering chambers employ sputtered targets which are wider than the transparent substrates being coated and are mounted in a direction extending perpendicular to the travel direction of the substrate. It will be within the ability of those skilled in the art to select suitable deposition conditions and parameters for cathodic planar sputtering of the various layers disclosed above for the transparent coated articles of the present invention. The following deposition parameters are suitable for a typical deposition process to produce a dual-function coating on a soda-lime-silica glass substrate 40 cm wide by 50 cm long traveling at a rate of 2 meters per minute through the sputtering chamber.

1. The sputtering chamber is initially evacuated to about $5 \times 10^{-5}$ millibar and then raised to an operating pressure of approximately $3 \times 10^{-3}$ millibar by the injection of operating gases at the various sputtering stations.
2. Tungsten oxide layers are deposited by cathodic sputtering from a pure tungsten target in an operating atmosphere of $0.2 \times 10^{-3}$ millibar with an Argon/Oxygen flow rate ratio of 40/53, at a power level of about 4 to 5.5 Watts/cm$^2$. The throw distance from the tungsten target to the substrate is typically about 5 to 15 cm.
3. The silver infra-red reflective layer is deposited from a pure silver target in a nonreactive atmosphere, for example, a substantially pure argon atmosphere, at a power level of about 0.4 to 2.6 Watts/cm$^2$. The throw distance from the silver target to the substrate is typically about 5 to 15 cm.
4. The silicon buffer layer is deposited from a silicon target, preferably a doped silicon target, such as silicon doped with boron, aluminum, etc., at a power level of about 0.4 to 2.5 Watts/cm$^2$. Another suitable dopant for the silica is nickel metal. Preferably a doping level of 5 parts per million is employed. The throw distance from the silicon target to the substrate is typically about 5 to 15 cm.

In accordance with certain preferred embodiments, a substantially transparent dual-function coating in accordance with the double-layer structure described above is formed by passing the substrate through the multi-station sputtering chamber a first time, followed by passing it through the sputtering chamber a second time. Preferably the deposition characteristics and process parameters are maintained the same before the two passes, such that substantially identical sets of layers are deposited during each pass. Optionally, a slightly thicker final tungsten oxide layer is deposited for enhanced performance characteristics. Thus, for example, if each of the first three tungsten oxide layers is 300Å thick, the final tungsten oxide layer may be from 300 to 340Å thick, such as 320Å thick.

In general, it would be understood that the thickness of the deposited layers will be determined largely by the deposition power level, working gas conditions, and the exposure time. The exposure time is determined primarily by the speed at which the substrate is traveling through the sputtering chamber, although additional thickness can be achieved by employing multiple targets for a deposited layer. Throw distance is also a significant factor in determining layer thickness. In preferred embodiments employing sputtering targets wider than the substrate, advantageously small throw distances can be used without sacrificing uniformity of deposition thickness.

Figure 12:
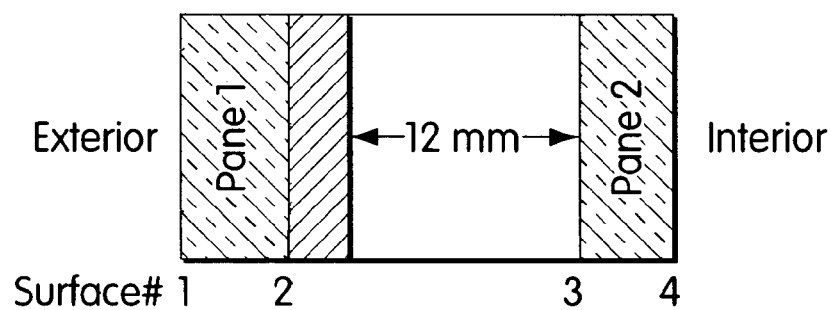
FIG. 12 is a schematic illustration of a multi-pane glazing system in accordance with a preferred embodiment, having a dual-functioning coating on surface No. 2 of the glazing panes.

It has been found that, generally, multi-pane glazing systems employing the dual-functioning coating of the present invention provide best results when the coating is placed at the second surface as illustrated in FIG. 12.

The present invention is further disclosed by the following examples, which are intended for purposes of illustration and not limitation.

EXAMPLES

The following examples illustrate coated articles according to the invention, and their manufacture. In each of the following examples, a soda-lime-silica glass panel 30 cm wide by 30 cm long by 6 mm thick is passed through a multi-station sputtering chamber, Model Z600 available from Balzers Process System. At the same time, for visual inspection, measurement and characterizations, a 5 cm wide by 5 cm long by 6 mm thick glass test piece is also coated in the same system. The glass substrates were coated and evaluated for 4 mm thick glass. The glass panel traveled in each case through the sputtering chamber at a travel speed of 2 meters per minute. Immediately prior to entering the sputtering chamber, the glass panel surface to be coated was washed with demineralized water (max 5 microsiemens) and substantially dried by pressurized air. For each of the examples, the sputtering conditions are provided for each layer of the dual-function coating. In those of the examples involving a double-layer structure, as disclosed above, the deposition conditions and parameters were identical for the first and second passes unless otherwise stated.

The spectral properties were measured for the resultant coated article of each example. Perkin Elmer Model Lambda 900 UV Vis NIR spectrophotometer was used to measure the optical performance of each sample, e.g., transmittance, T%, reflectance from film side, R%, and reflectance from glass side, R'%, with all spectra being measured over the 350 nm–2100 nm spectral region. The weighted spectral averages of the visible region, $T_{vis}$, $R_{vis}$, $R'_{vis}$ and other performance and color information shown in Tables 1–6 were determined by the "Window 4.0", and Uwinter and Usummer were calculated using the "Window 4.1" calculation program both publicly available from the USA Department of Energy. These "U" values are a measure of overall conductance of the thermal energy in terms of Watt/m$^2$ K, calculated using the following table:

| Name | | Outside Temp (° C.) | Inside Temp (° C.) | Wind Speed (m/s) | Wind Direction | Direct Solar (W/m$^2$) | $T_{sky}$ (° C.) | $E^{sky}$ |
|---|---|---|---|---|---|---|---|---|
| Uwinter | Uvalue | −17.8 | 21.1 | 6.7 | 0 Windward | 0.0 | −17.8 | 1.00 |
| | Solar | −17.8 | 21.1 | 6.7 | 0 Windward | 0.0 | −17.8 | 1.00 |
| Usummer | Uvalue | 31.7 | 23.9 | 3.4 | 0 Windward | 783.0 | 31.7 | 1.00 |
| | Solar | 31.7 | 23.9 | 3.4 | 0 Windward | 783.0 | 31.7 | 1.00 |

In addition, the $R_S$ surface resistance was measured by a Signatron four probe, and emissivity, e was measured by an IR spectrometer and calculated from the following equation:

$$e = 1 - (1/((1+0.0053) \times R_S))^2$$

Ref.: K. L. Chopra, S. Major, D. K. Pandya. It was found that measured and calculated values fit well with each other for the films having surface resistance $R_S$ less than 10 Omhs. The shading coefficient, sc, was calculated as the performance ratio, $T_{vis}/T_{solar}$, was used to determine the quality of the coatings. The theoretical limit of the $T_{vis}/T_{total}$ solar ratio is 2.15.

Example 1

A glass panel was prepared and passed through the multi-station sputtering chamber as described above. In this example, the multi-functional coating was $WO_3$/Ag/Silicon Oxide/$WO_3$, where the first $WO_3$ layer (directly on the glass substrate surface) is thicker than the top most $WO_3$ layer. The total thickness of the coating was around 500Å.

At station 1 within the multi-station sputtering chamber, a 220Å thick layer of $WO_x$ was deposited by sputtering from a Tungsten (W) target at 4.65 Watts/cm$^2$ in an atmosphere of Argon and Oxygen gasses with the flow ratio of 40 to 53 sccm (i.e., with Argon and Oxygen flow rates of 40 sccm and 53 sccm, respectively) at a vacuum level of 2.3×10$^{-3}$ mbar.

At station 2, within the multi-station sputtering chamber, a 100Å thick layer of Ag was deposited by sputtering from a Silver (Ag) target at 1.16 Watts/cm$^2$ in an atmosphere of Argon gas with a flow rate of 50 sccm at a vacuum level of 2.2×10$^{-3}$ mbar.

At station 3, within the multi-station sputtering chamber, a 20Å thick layer of Si was deposited by sputtering from a Silicon (Si) target at 0.46 Watts/cm$^2$ in an atmosphere of Argon gas with the flow rate of 40 sccm at a vacuum level of 1.7×10$^{-3}$ mbar.

At station 4, within the multi-station sputtering chamber, a 180Å thick layer of $WO_x$ was deposited by sputtering from a Tungsten (W) target at 4.18 Watts/cm$^2$ in an atmosphere of Argon and Oxygen gasses with a flow rate of 40 to 53 sccm at a vacuum level of 2.4×10$^{-3}$ mbar.

Figure 4:
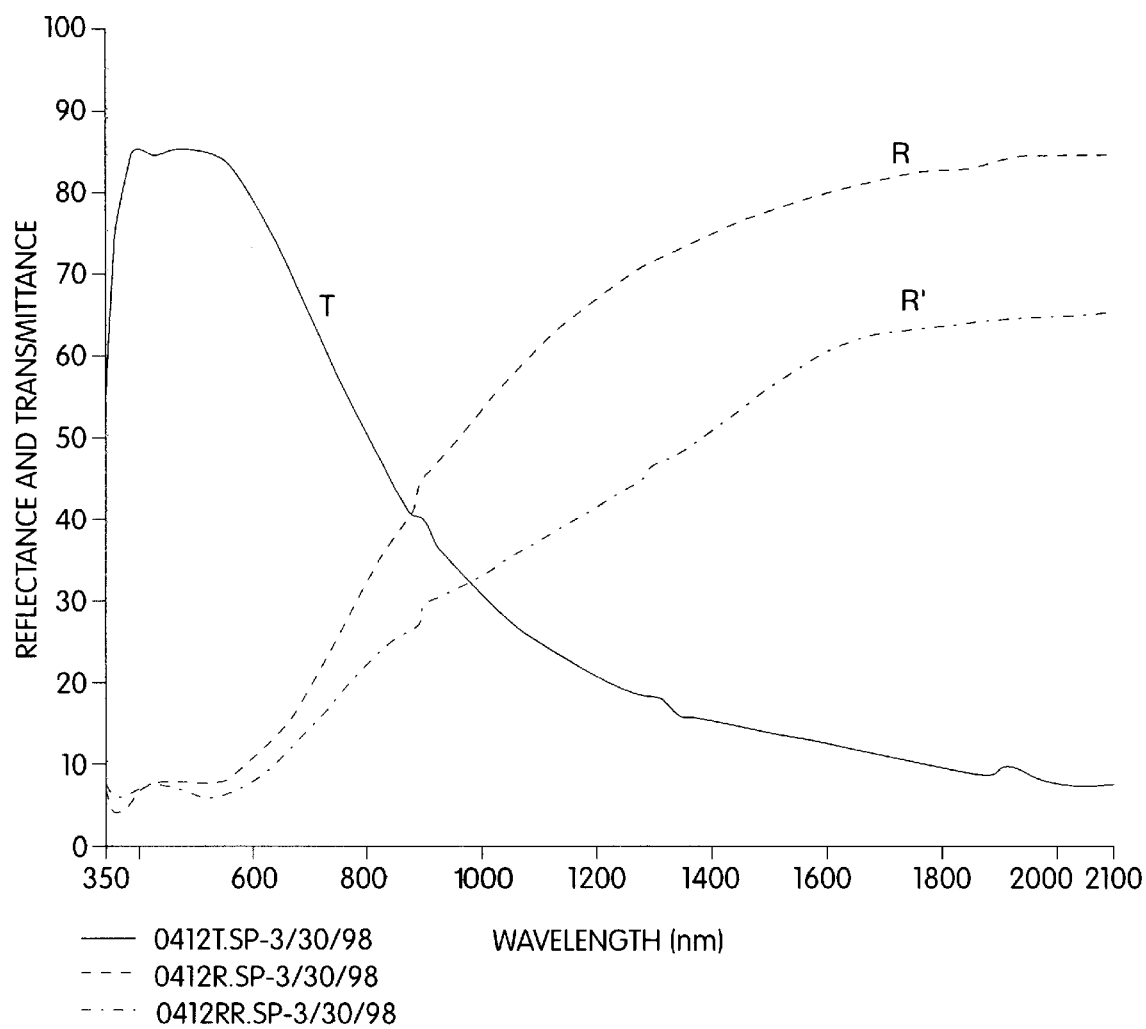
FIGS. 4–9 are graphical representations of the spectral properties of various preferred embodiments described in Examples 1–6, respectively.

The resultant coated glass panel had good color uniformity. Its spectral properties are shown in Table 1 below, and spectral transmittance properties of the coated panel of Example 1 are shown in the graph of FIG. 4, wherein the horizontal axis shows wavelength and the vertical axis shows level of transmittance. As noted above, coated articles of these examples were characterized by spectrophotometric measurements (Perkin Elmer Lambda 900 UV/VIS/NIR Spectrometer), resistance measurements (signatone four probes Model SYS 301 instrument combined with Keithly Model 224 current source and Model 2000 multimeter), and thickness measurements (Tencor Alpha Step Model 500). Spectrophotometric measurements were taken over 350 nm to 2100 nm spectral region, including transmittance T%, reflection R% measured from the coated side, and reflection R'% measured from the glass (uncoated) side. R, R' and T spectra and the thicknesses of each individual layer of the coating can be used for library preparation and modeling (Film 2000 modeling program of Kidger Optics). Modeling of the multi-functional layer system can help predict actual deposition, as well as any interface effects the total coating. The R, R' and T spectra are shown in the graphs of FIGS. 4–7 as three corresponding lines. Each of the different lines is identified by legend which includes the three digit number of the "sample code name" (See Table 1 for the sample code name of the coating produced by Example 1, and the tables associated with the other Examples for the sample code names of those other coatings.) and by the letter "T" for the transmittance spectrum line, the letter R for the reflectance spectrum line of the coated side, and the letters "RR" for the reflectance spectrum line of the opposite, i.e., uncoated side. In FIG. 4 the line indicated as "0412RR.SP" represents the reflectance spectrum measured for the uncoated side of the coated pane of Example 1. The line indicated as "0412R.SP" represents the reflectance spectrum measured for the coated side of the coated pane of Example 1. The line indicated as "0412T.SP" in FIG. 4 represents the transmittance spectrum. As can be seen from Table 1 and the graph of FIG. 4, the coated panel prepared in accordance with this Example 1 has excellent transmittance of visible light together with low emissivity and good anti-solar properties. In addition, it has excellent mechanical properties, including long shelf life. Furthermore, the coating process can be seen from the description here to be fast and economical, so as to be commercially suitable for producing automotive and architectural glazing products. In that regard, the sputter deposition process required only approximately 2.5 minutes.

TABLE 1

| ID No. | Example 1 |
| Sample Code Name: | IMF412 |
| Substrate Thickness: | 4 mm |
| Film Resistance: | 6 ohm |

OPTICAL PROPERTIES OF COATED GLASS

|  | $T_{sol}$ (solar) | $R_{sol}$ (solar) | $T_{vis}$ (visible) | $R_{vis}$ (visible) | e (Emissivity) |
| --- | --- | --- | --- | --- | --- |
| Film Side | 0.514 | 0.355 | 0.823 | 0.086 | 0.061 |
| Glass Side | 0.514 | 0.250 | 0.823 | 0.068 | 0.840 |

COLOR PROPERTIES

|  | DomWL | Purity | L* | a* | b* |
| --- | --- | --- | --- | --- | --- |
| Film Side |  |  |  |  |  |
| Transmittance | 0.48379 | 2.80% | 92.9 | −3.30 | −1.60 |
| Reflectance | 0.90448 | 6.10% | 34.9 | 7.13 | 2.68 |
| Glass Side |  |  |  |  |  |
| Transmittance | 0.48379 | 2.80% | 92.9 | −3.30 | −1.60 |
| Reflectance | 0.49574 | 5.70% | 31.3 | 7.12 | −1.00 |

DOUBLE GLAZING SYSTEM
OPTICAL AND THERMAL PROPERTIES

|  | $T_{sol}$ | $R_{sol}$ | $T_{vis}$ | $R_{vis}$ |  |
| --- | --- | --- | --- | --- | --- |
| Outer Side | 0.439 | 0.279 | 0.739 | 0.127 |  |
| Inner Side | 0.439 | 0.307 | 0.739 | 0.154 |  |
| Uwinter | Usummer | SCc | SHGCc | RHG | Tv/SHGCc |
| 1.73 | 1.79 | .057 | 0.49 | 373 | 1.51 |

COLOR PROPERTIES

| Outer side | DomWL | Purity | L* | a* | b* |
| --- | --- | --- | --- | --- | --- |
| Transmittance | 0.48594 | 3.10% | 89.1 | −4.3 | −1.2 |
| Reflectance | 0.53593 | 3.40% | 42.3 | 2.94 | −1.8 |

DomWL: Dominant wavelength;
a*, b*, L*: Color coordinates in CIE uniform color space
SCc: Shedding coefficient;
SHGCc: Solar heat gain coefficient;
RHG: Relative heat gain Example 2

Figure 5:
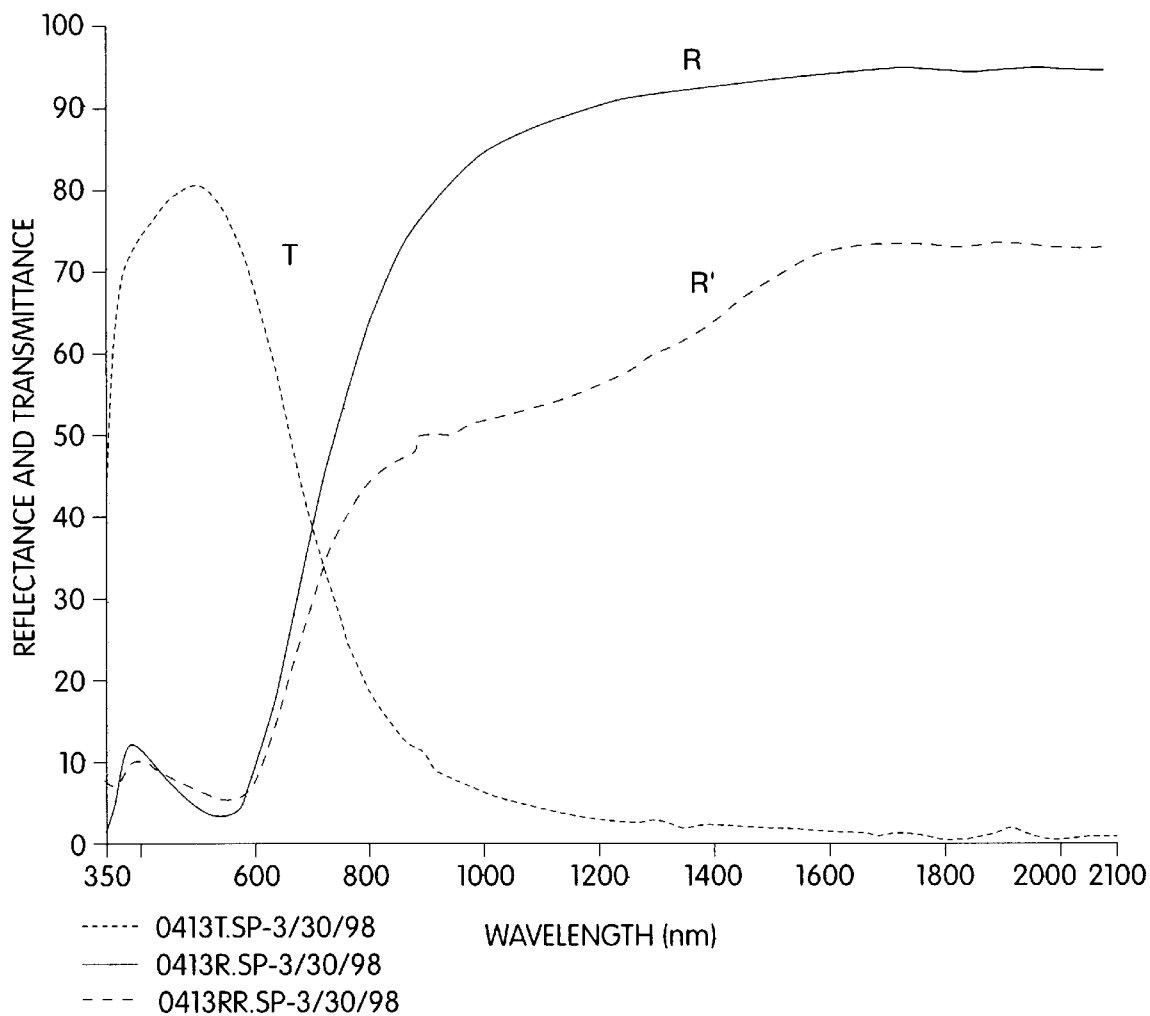

A glass panel was prepared and passed through the multi-station sputtering chamber as described above in Example 1, except that in this example the coating was produced by passing the glass panel twice through the coater. That is, a coating was prepared as in Example 1 described above, and then the glass panel was passed through the sputtering chamber a second time to obtain a double-layer structure coating. The same deposition parameters were maintained during the second pass. Its spectral properties are shown in Table 2 below. Spectral transmittance properties of the coated panel of Example 2 are shown in the graph of FIG. 5. The total thickness of the resultant counting was around 1000Å.

TABLE 2

| ID No. | Example 2 |
| Sample Code Name: | IMF413 |
| Substrate Thickness: | 4 mm |
| Film Resistance: | 2 ohm |

OPTICAL PROPERTIES OF COATED GLASS

|  | $T_{sol}$ | $R_{sol}$ | $T_{vis}$ | $R_{vis}$ | e |
| --- | --- | --- | --- | --- | --- |
| Film Side | 0.351 | 0.500 | 0.758 | 0.058 | 0.021 |
| Glass Side | 0.351 | 0.353 | 0.758 | 0.067 | 0.840 |

COLOR PROPERTIES

|  | DomWL | Purity | L* | a* | b* |
| --- | --- | --- | --- | --- | --- |
| Film Side |  |  |  |  |  |
| Transmittance | 0.48878 | 4.00% | 90.0 | −7.20 | −0.80 |
| Reflectance | 0.52863 | 26.00% | 28.9 | 21.70 | −11.00 |
| Glass Side |  |  |  |  |  |
| Transmittance | 0.48878 | 4.00% | 90.0 | −7.20 | −0.80 |
| Reflectance | 0.52895 | 16.20% | 31.1 | 13.40 | −6.90 |

DOUBLE GLAZING SYSTEM
OPTICAL AND THERMAL PROPERTIES

|  | $T_{sol}$ | $R_{sol}$ | $T_{vis}$ | $R_{vis}$ |  |
| --- | --- | --- | --- | --- | --- |
| Outer Side | 0.308 | 0.373 | 0.680 | 0.117 |  |
| Inner Side | 0.308 | 0.401 | 0.680 | 0.131 |  |
| Uwinter | Usummer | SCc | SHGCc | RHG | Tv/SHGCc |
| 1.65 | 1.66 | 0.40 | 0.34 | 266 | 2.00 |

COLOR PROPERTIES

| Outer side | DomWL | Purity | L* | a* | b* |
| --- | --- | --- | --- | --- | --- |
| Transmittance | 0.48933 | 4.40% | 66.3 | −7.80 | −0.70 |
| Reflectance | 0.54958 | 9.00% | 40.8 | 6.37 | −5.50 |

DomWL: Dominant wavelength;
a*, b*, L*: Color coordinates in CIE uniform color space
SCc: Shedding coefficient;
SHGCc: Solar heat gain coefficient;
RHG: Relative heat gain As can be seen from Table 2 and the graph of FIG. 5, the coated panel prepared in accordance with this Example 2 has excellent transmittance of visible light together with low emissivity and good anti-solar properties. It is highly noteworthy that the ratio of visible transmittance to the total energy transmittance (.i.e, the $T_v$/SHGCc value shown in Table 2 for the product of this Example 2 was 2.0. It will be recognized by those skilled in the art that the theoretical maximum for this value is approximately 2.15. That is, it is generally understood that the transmitted percentage of visible light cannot substantially exceed twice the transmitted percentage of total solar energy. Thus, the product of this Example 2, being a preferred embodiment of the present invention, is nearly the limit value. In addition, it has excellent mechanical properties, including long shelf life. Furthermore, the coating process can be seen from the description here to be fast and economical, so as to be commercially suitable for producing automotive and architectural glazing products. In that regard, the sputter deposition process required only approximately 5 minutes.

Example 3

A glass panel was prepared and passed through the multi-station sputtering chamber as described above for Example 1. In this example multi-functional coating was $WO_3$/Ag/Silicon Oxide/$WO_3$ where the first $WO_3$ layer (i.e., the layer directly on the glass substrate surface) is thinner than the top most $WO_3$ layer. The total thickness of this system was around 400Å.

At station 1 within the multi-station sputtering chamber, a 165Å thick layer of $WO_x$ was deposited by sputtering from a Tungsten (W) target at 3.83 Watts/cm² in an atmosphere of Argon and Oxygen gasses at the flow rate of 40 to 53 sccm and a vacuum level of $2.7 \times 10^{-3}$ mbar.

At station 2 within the multi-sputtering chamber, a 125Å thick layer of Ag was deposited by sputtering from a Silver (Ag) target at 1.28 Watts/cm² in an atmosphere of Argon gas with a flow rate of 50 sccm and a vacuum level of $2.2 \times 10^{-3}$ mbar.

At station 3 within the multi-station sputtering chamber, a 20Å thick layer of Si was deposited by sputtering from a Silicon (Si) target at 0.58 Watts/cm² in an atmosphere of Argon gas with the flow rate of 40 sccm and a vacuum level of $1.7 \times 10^{-3}$ mbar.

At station 4 within the multi-station sputtering chamber, a 190Å thick layer of $WO_x$ was deposited by sputtering from a Tungsten (W) target at 4.3 Watts/cm² in an atmosphere of Argon and Oxygen gasses with the flow rate of 40 to 53 sccm, and at vacuum level of $2.4 \times 10^{-3}$ mbar.

Figure 6:
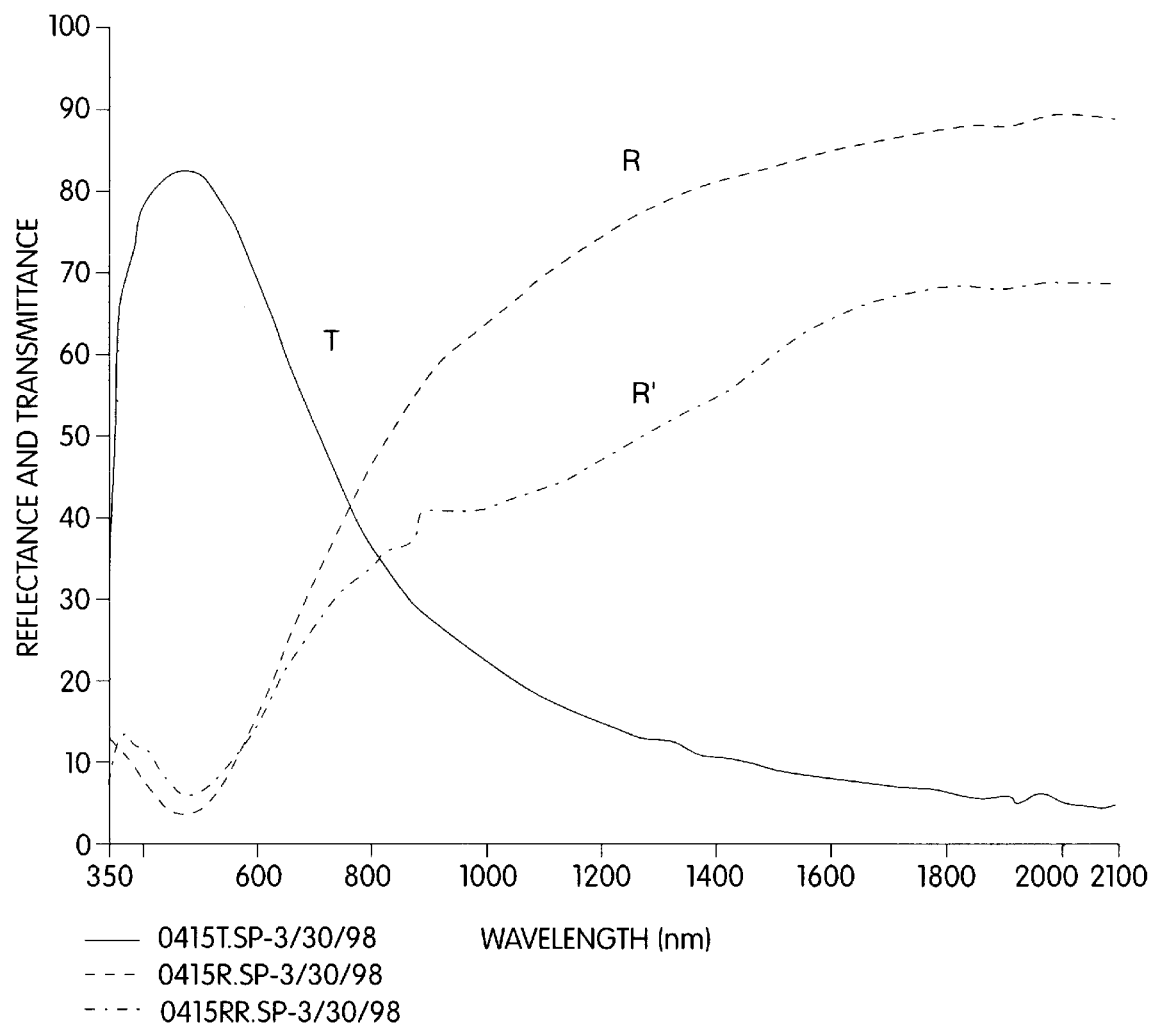

The resultant coated glass panel had good color uniformity. Its spectral properties are shown in Table 3 below. Spectral transmittance properties of the coated panel of Example 3 are shown in the graph of FIG. 6.

TABLE 3

| ID No. | Example 3 |
| Sample Code Name: | IMF415 |
| Substrate Thickness: | 4 mm |
| Film Resistance: | 4 ohm |

OPTICAL PROPERTIES OF COATED GLASS

| | $T_{sol}$ | $R_{sol}$ | $T_{vis}$ | $R_{vis}$ | e |
|---|---|---|---|---|---|
| Film Side | 0.441 | 0.312 | 0.765 | 0.098 | 0.041 |
| Glass Side | 0.441 | 0.420 | 0.765 | 0.091 | 0.840 |

COLOR PROPERTIES

| | DomWL | Purity | L* | a* | b* |
|---|---|---|---|---|---|
| Film Side | | | | | |
| Transmittance | 0.48396 | 5.20% | 90.4 | −6.20 | −2.80 |
| Reflectance | 0.59944 | 38.90% | 34.8 | 21.70 | 14.40 |
| Glass Side | | | | | |
| Transmittance | 0.48396 | 5.20% | 90.4 | −6.20 | −2.80 |
| Reflectance | 0.63858 | 18.50% | 36.5 | 17.80 | −5.40 |

DOUBLE GLAZING SYSTEM OPTICAL AND THERMAL PROPERTIES

| | $T_{sol}$ | $R_{sol}$ | $T_{vis}$ | $R_{vis}$ | |
|---|---|---|---|---|---|
| Outer Side | 0.38 | 0.335 | 0.687 | 0.148 | |
| Inner Side | 0.38 | 0.35 | 0.687 | 0.157 | |
| Uwinter | Usummer | SCc | SHGCc | RHG | Tv/SHGCc |
| 1.69 | 1.73 | 0.49 | 0.42 | 325 | 1.64 |

TABLE 3-continued

COLOR PROPERTIES

| Outer side | DomWL | Purity | L* | a* | b* |
|---|---|---|---|---|---|
| Transmittance | 0.48531 | 5.30% | 86.7 | −6.20 | −2.30 |
| Reflectance | 0.48719 | 3.30% | 44.9 | 11.30 | 2.43 |

DomWL: Dominant wavelength;
a*, b*, L*: Color coordinates in CIE uniform color space
SCc: Shedding coefficient;
SHGCc: Solar heat gain coefficient;
RHG: Relative heat gain As can be seen from Table 3 and the graph of FIG. 6, the coated panel prepared in accordance with this Example 3 has excellent transmittance of visible light together with low emissivity and good anti-solar properties. In addition, it has excellent mechanical properties, including long shelf life. Furthermore, the coating process can be seen from the description here to be fast and economical, so as to be commercially suitable for producing automotive and architectural glazing products. In that regard, the sputter deposition process required only approximately 2.5 minutes.

Example 4

Figure 7:
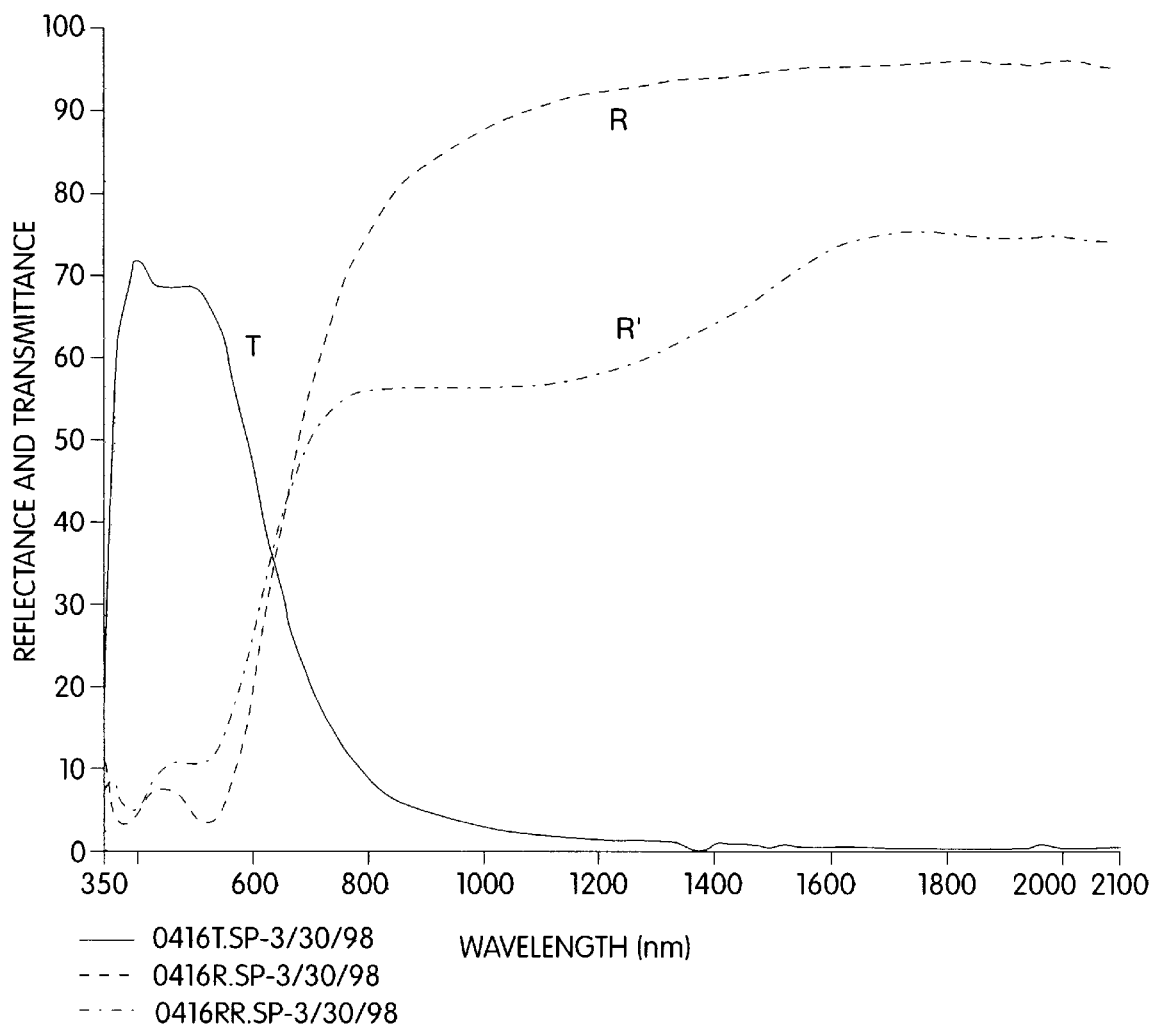
Figure 8:
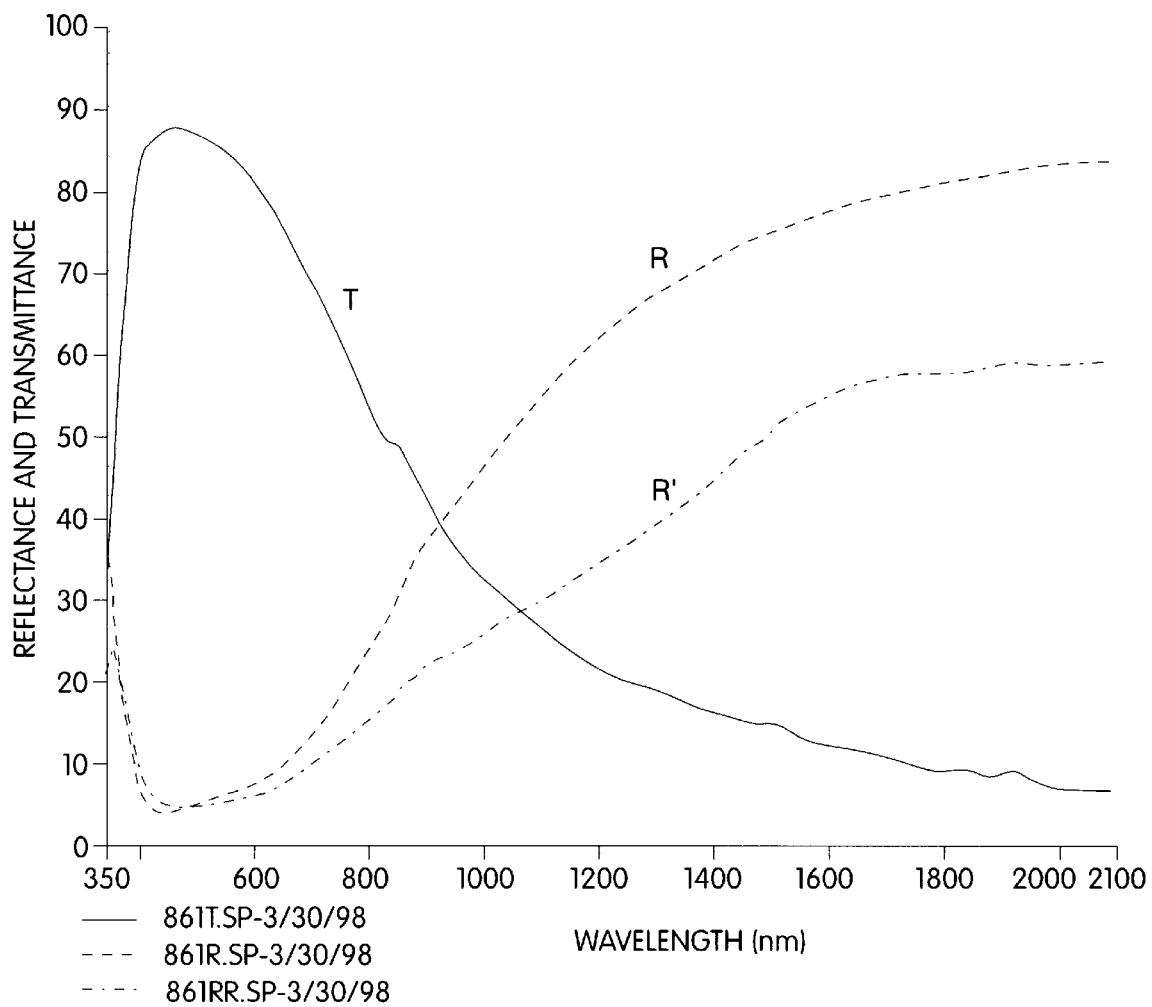
Figure 9:
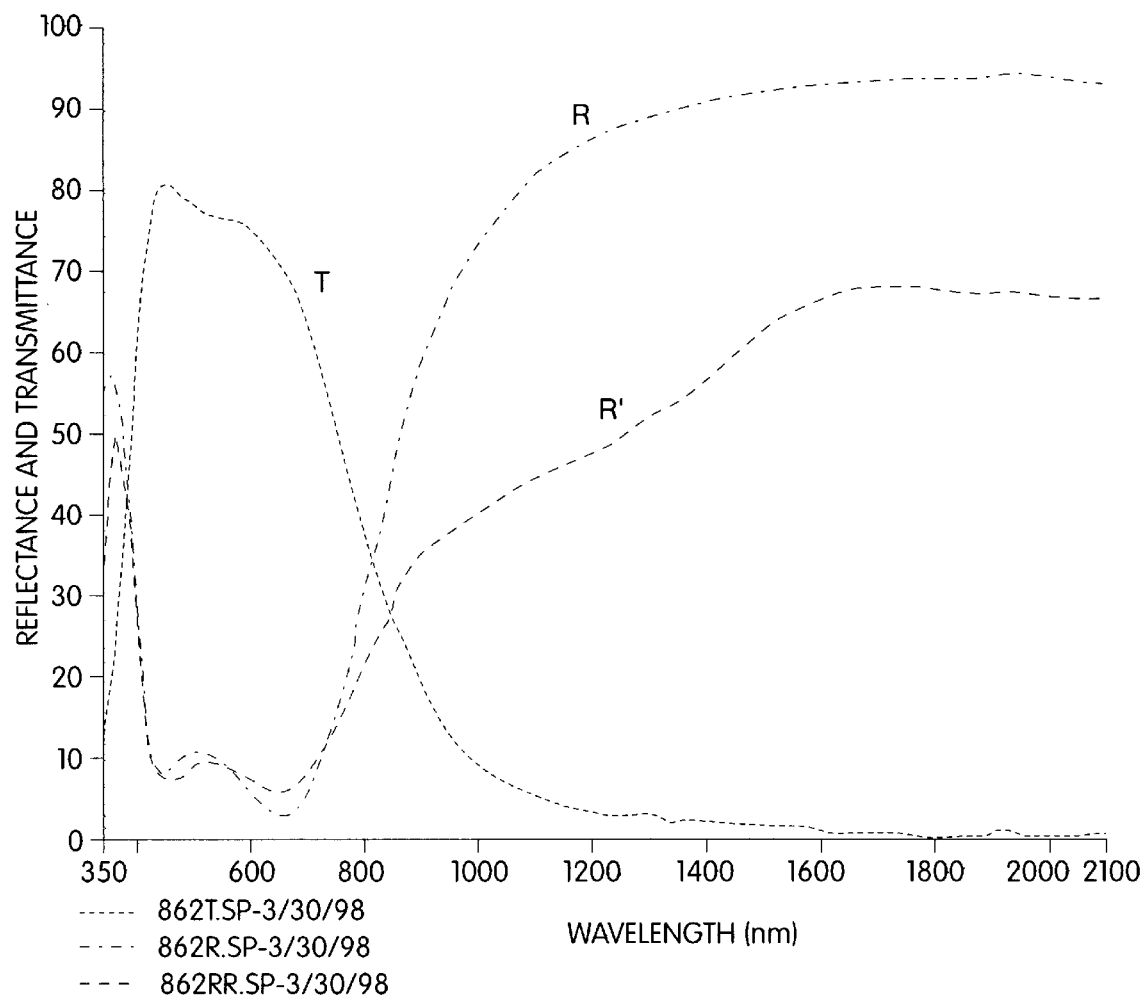

A glass panel was prepared and passed through the multi-station sputtering chamber as described above in Example 3, except that the glass panel was passed through the sputtering chamber a second time to obtain a double-layer structure coating. The same deposition parameters were maintained during the second pass. The resultant coated glass panel had good color uniformity. Its spectral properties are shown in Table 4 below. The total thickness of this the coating was about 800Å. Spectral transmittance properties of the coated panel of Example 4 are shown in the graph of FIG. 7.

TABLE 4

| ID No. | Example 4 |
| Sample Code Name: | IMF416 |
| Substrate Thickness: | 4 mm |
| Film Resistance: | 1 ohm |

OPTICAL PROPERTIES OF COATED GLASS

| | $T_{sol}$ | $R_{sol}$ | $T_{vis}$ | $R_{vis}$ | e |
|---|---|---|---|---|---|
| Film Side | 0.261 | 0.557 | 0.600 | 0.091 | 0.010 |
| Glass Side | 0.261 | 0.433 | 0.600 | 0.161 | 0.840 |

COLOR PROPERTIES

| | DomWL | Purity | L* | a* | b* |
|---|---|---|---|---|---|
| Film Side | | | | | |
| Transmittance | 0.48184 | 12.60% | 82.5 | −11.00 | −7.60 |
| Reflectance | 0.48885 | 14.3% | 35.1 | 32.00 | 5.01 |
| Glass Side | | | | | |
| Transmittance | 0.48100 | 12.60% | 82.5 | −11.00 | −7.60 |
| Reflectance | 0.59055 | 37.00% | 46.0 | 18.60 | 17.70 |

TABLE 4-continued

DOUBLE GLAZING SYSTEM
OPTICAL AND THERMAL PROPERTIES

| | $T_{sol}$ | $R_{sol}$ | $T_{vis}$ | $R_{vis}$ | |
|---|---|---|---|---|---|
| Outer Side | 0.231 | 0.445 | 0.540 | 0.193 | |
| Inner Side | 0.231 | 0.441 | 0.540 | 0.157 | |
| Uwinter | Usummer | SCc | SHGCc | RHG | Tv/SHGCc |
| 1.62 | 1.63 | .0.31 | 0.26 | 205 | 2.08 |

COLOR PROPERTIES

| Outer side | DomWL | Purity | L* | a* | b* |
|---|---|---|---|---|---|
| Transmittance | 0.48230 | 12.60% | 79.10 | −12.00 | −7.00 |
| Reflectance | 0.59107 | 25.10% | 50.20 | 14.40 | 12.40 |

DomWL: Dominant wavelength;
a*, b*, L*: Color coordinates in CIE uniform color space
SCc: Shedding coefficient;
SHGCc: Solar heat gain coefficient;
RHG: Relative heat gain As can be seen from Table 4 and the graph of FIG. 7, the coated panel prepared in accordance with this Example 4 has excellent transmittance of visible light together with low emissivity and good anti-solar properties. In addition, it has excellent mechanical properties, including long shelf life. Furthermore, the coating process can be seen from the description here to be fast and economical, so as to be commercially suitable for producing automotive and architectural glazing products. In that regard, the sputter deposition process required only approximately 5 minutes. This cycle time depends on the number of targets used to deposit $WO_x$ anti-reflection films. Thus, using more targets can result in faster cycle times. Typically, the deposition process can be run so as to require only approximately 2.5 minutes cycle time.

Example 5

A glass panel was prepared and passed through the multi-station sputtering chamber as described above, to deposit a multi-functional coating of $WO_3/AG/Silicon$ $Oxide/WO_3$, where the first $WO_3$ layer directly on the glass is thicker than the top most $WO_3$ layer. The total thicknesses of the coating was about 930Å.

At station 1 within the multi-station sputtering chamber, a 410Å thick layer of $WO_x$ was deposited by sputtering from a Tungsten (W) target at 4.65 Watts/cm² in an atmosphere of Argon and Oxygen gases with a flow rate of 40 to 53 sccm at a vacuum level of $2.5 \times 10^{-3}$ mbar.

At station 2 within the multi-station sputtering chamber, a 110Å thick layer of Ag was deposited by sputtering from a Silver (Ag) target at 1.16 Watts/cm² in an atmosphere of Argon gas with the flow rate of 50 sccm at a vacuum level of $2.2 \times 10^{-3}$ mbar.

At station 3 within the multi-station sputtering chamber, a 20Å thick layer of Si was deposited by sputtering from a Silicon (Si) target at 0.46 Watts/cm² in an atmosphere of Argon gas with the flow rate of 40 sccm at a vacuum level of $1.8 \times 10^{-3}$ mbar.

At station 4 within the multi-station sputtering chamber, a 390Å thick layer of $WO_x$ was deposited by sputtering from a Tungsten (W) target at 4.18 Watts/cm² in an atmosphere of Argon and Oxygen gases with a flow rate of 40 to 53 sccm at a vacuum level of $2.5 \times 10^{-3}$ mbar.

TABLE 5

| ID No. | Example 5 |
|---|---|
| Sample Code Name: | IMF861 |
| Substrate Thickness: | 6 mm |
| Film Resistance: | 6 ohm |

OPTICAL PROPERTIES OF COATED GLASS

| | $T_{sol}$ | $R_{sol}$ | $T_{vis}$ | $R_{vis}$ | e |
|---|---|---|---|---|---|
| Film Side | 0.536 | 0.315 | 0.843 | 0.062 | 0.061 |
| Glass Side | 0.536 | 0.206 | 0.843 | 0.053 | 0.840 |

COLOR PROPERTIES

| | DomWL | Purity | L* | a* | b* |
|---|---|---|---|---|---|
| Film Side | | | | | |
| Transmittance | 0.48342 | 2.60% | 93.8 | −3.00 | −1.50 |
| Reflectance | 0.58298 | 20.20% | 29.4 | 5.05 | 7.27 |
| Glass Side | | | | | |
| Transmittance | 0.48342 | 2.60% | 93.8 | −3.00 | −1.50 |
| Reflectance | 0.49660 | 4.10% | 27.4 | 4.50 | −0.70 |

DOUBLE GLAZING SYSTEM
OPTICAL AND THERMAL PROPERTIES

| | $T_{sol}$ | $R_{sol}$ | $T_{vis}$ | $R_{vis}$ | |
|---|---|---|---|---|---|
| Outer Side | 0.436 | 0.236 | 0.745 | 0.113 | |
| Inner Side | 0.436 | 0.236 | 0.745 | 0.131 | |
| Uwinter | Usummer | SCc | SHGCc | RHG | Tv/SHGCc |
| 1.72 | 1.80 | 0.59 | 0.51 | 385 | 1.45 |

COLOR PROPERTIES

| Outer side | DomWL | Purity | L* | a* | b* |
|---|---|---|---|---|---|
| Transmittance | 0.48576 | 3.40% | 89.4 | −4.70 | −1.40 |
| Reflectance | 0.44985 | 2.40% | 40.1 | 0.74 | −1.70 |

DomWL: Dominant wavelength;
a*, b*, L*: Color coordinates in CIE uniform color space
SCc: Shedding coefficient;
SHGCc: Solar heat gain coefficient;
RHG: Relative heat gain Example 6

A glass panel was prepared and passed through the multi-station sputtering chamber as described above in Example 5, except that the panel was then passed again through the multi-sputtering chamber to produce a double-layer structure coating. The total thickness of the resultant coating was about 1860Å.

TABLE 6

| ID No. | Example 6 |
|---|---|
| Sample Code Name: | IMF862 |
| Substrate Thickness: | 6 mm |
| Film Resistance: | 2 ohm |

OPTICAL PROPERTIES OF COATED GLASS

| | $T_{sol}$ | $R_{sol}$ | $T_{vis}$ | $R_{vis}$ | e |
|---|---|---|---|---|---|
| Film Side | 0.403 | 0.411 | 0.763 | 0.084 | 0.033 |
| Glass Side | 0.403 | 0.277 | 0.763 | 0.082 | 0.840 |

TABLE 6-continued

COLOR PROPERTIES

|  | DomWL | Purity | L* | a* | b* |
|---|---|---|---|---|---|
| Film Side | | | | | |
| Transmittance | 0.48229 | 1.90% | 90.1 | −1.80 | −1.20 |
| Reflectance | 0.48483 | 17.40% | 35.2 | −11.00 | −3.90 |
| Glass Side | | | | | |
| Transmittance | 0.48229 | 1.90% | 90.1 | −1.80 | −1.20 |
| Reflectance | 0.47616 | 10.80% | 34.6 | −2.00 | −4.80 |

DOUBLE GLAZING SYSTEM
OPTICAL AND THERMAL PROPERTIES

|  | $T_{sol}$ | $R_{sol}$ | $T_{vis}$ | $R_{vis}$ | |
|---|---|---|---|---|---|
| Outer Side | 0.337 | 0.299 | 0.675 | 0.131 | |
| Inner Side | 0.337 | 0.294 | 0.675 | 0.149 | |
| Uwinter | Usummer | SCc | SHGCc | RHG | Tv/SHGCc |
| 1.66 | 1.71 | 0.45 | 0.39 | 300 | 1.73 |

COLOR PROPERTIES

| Outer side | DomWL | Purity | L* | a* | b* |
|---|---|---|---|---|---|
| Transmittance | 0.48544 | 2.80% | 86.0 | −3.70 | −1.20 |
| Reflectance | 0.47700 | 9.00% | 43.2 | −2.60 | −4.40 |

DomWL: Dominant wavelength;
a*, b*, L*: Color coordinates in CIE uniform color space
SCc: Shedding coefficient;
SHGCc: Solar heat gain coefficient;
RHG: Relative heat gain Example 7

This example shows the design and optimization procedure of a multi-functional coating system in accordance with the present invention. A thin film multi-layer computer program was used, specifically, the Kidger Optics Film 2000 program, and a library was prepared for thin films of Tungsten Oxide, Silver and Silicon deposited by the planar magnetron sputtering process employed in Examples 1–6, above. The library of the sputtered materials comprised refractive index and extinction coefficient spectra determined in the spectral region extending from 350 nm to 2100 nm. Once it is called from the material library and loaded into the Film 2000 program and the layer thickness and number of layers selected, the program calculates and plots the transmittance and reflective spectra of the designed multi-layer system. To identify buffer layer properties, each individual layer thickness and the total thickness of the coating was measured. The T% and R% spectra of the actual and designed coatings were compared. This comparison predicts the buffer layer thickness comprising 3Å thick Si and 17Å thick $SiO_2$.

The second aspect of this example is to show the color and performance control of the multi-functional coated article by changing the thickness of 1) the anti-reflecting oxide film, and 2) the IR reflecting silver film. A colorless multi-functional article in accordance with the present invention was prepared having the coating: $WO_3/Ag/Si+SiO_2/WO_3$ with the respective layer thicknesses (in angstroms) of 400/110/3+17/400. Visible T% and R% of the coated glazing system was about 86% and 4%, respectively. A 10% increase in Ag thickness (400/122/3+17/400Ås) improves the $T_{vis}/T_{total\ solar}$ ratio from 86/61 to 86/59 without any visible color effects. The same 10% thickness increase on $WO_3$ films does not effect the color appearance of the system. That is, the aforesaid coating having film thicknesses of 440/110/3+17/360 and 360/110/3+17/440 are still colorless.

Figure 10:
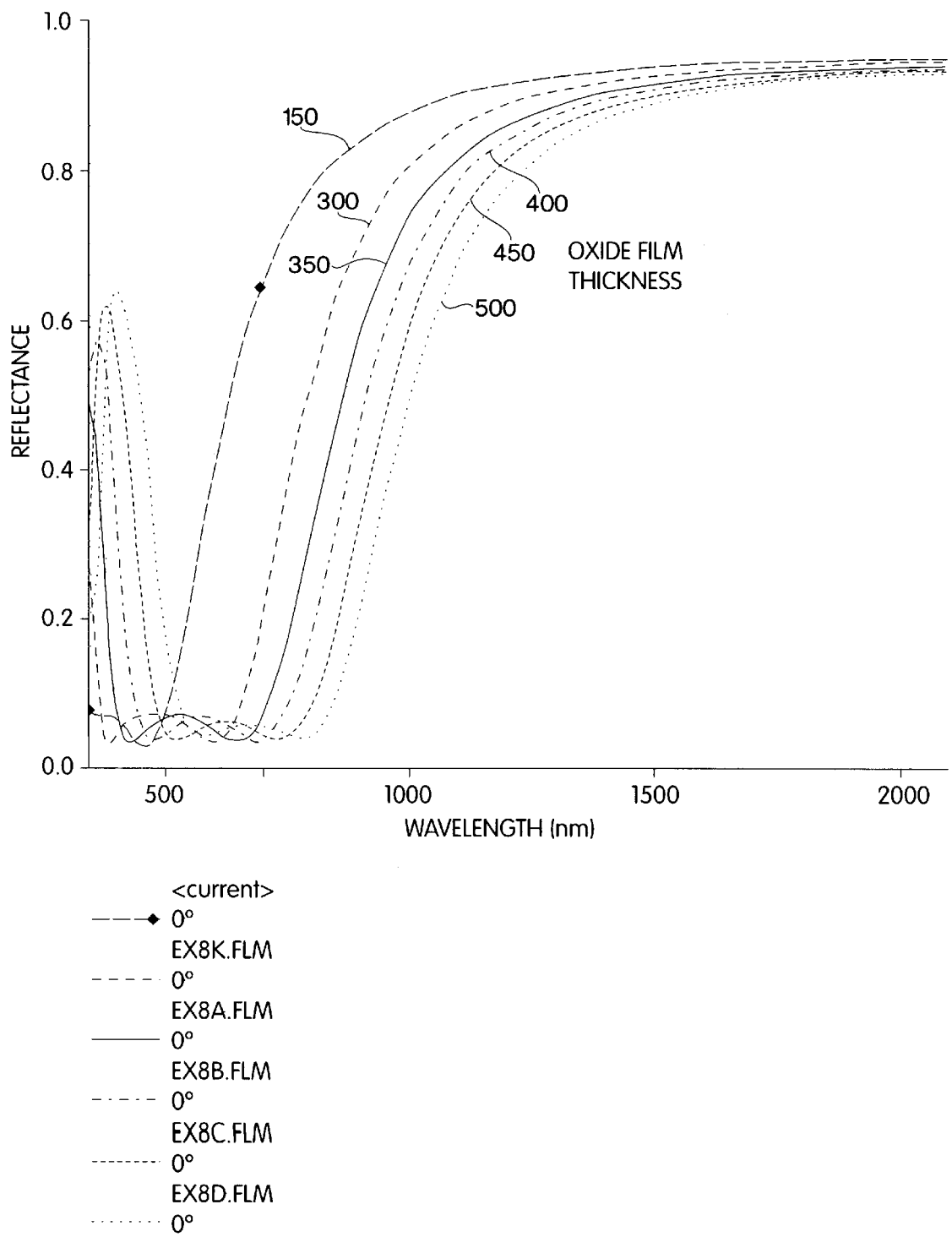
FIGS. 10 and 11 are graphical representations discussed in Example 7, below.
Figure 11:
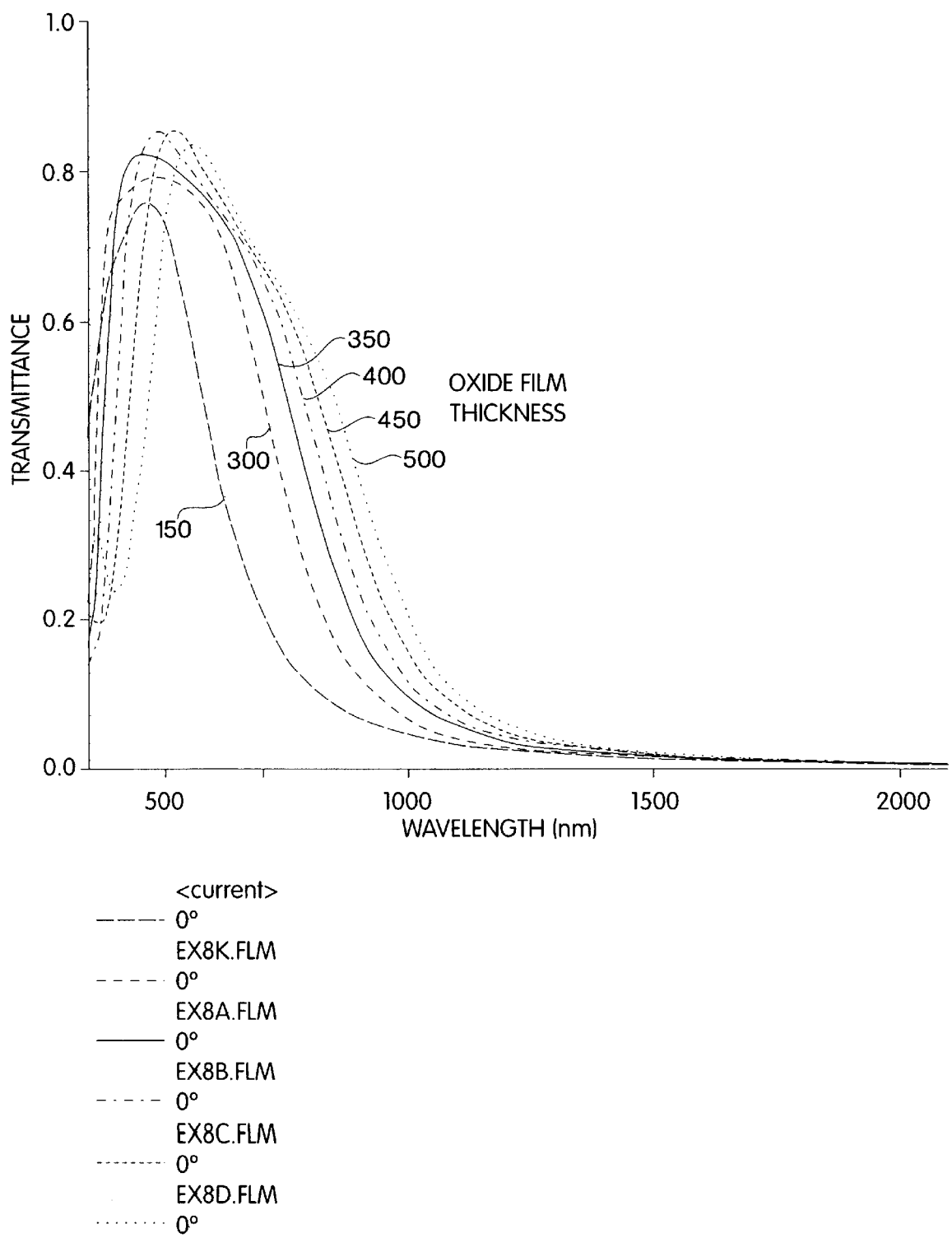

Colored articles are obtained with decreasing thicknesses of the $WO_3$ layers and/or by adjusting the thickness of the Si buffer layer. R% and T% plots given in FIGS. 10 and 11 correspond to a double-passed $WO_3/Ag/Si+SiO_2/WO_3$ $Ag/Si+SiO_2/WO_3$ system with the respective thicknesses of d/110/3+17/2d/110/3+17/d where d is the thickness of the $WO_3$ film and is from 150Å to 500Å. It can be seen in FIGS. 10 and 11 that thinner $WO_3$ films shift the T% and the R% plots to the shorter wavelengths. Likewise, replacing the Si and $SiO_2$ layer in the preceding example (that is, having a thickness of 3Å+17Å) with a thicker Si and $SiO_2$ layer can be employed to provide color to the resultant colored article.

It will be apparent from the foregoing disclosure that alternative embodiments are possible within the scope of the invention, including, for example, modifications to the preferred embodiments described above.

It will be recognized by those skilled in the art, given the benefit of the present invention, that coated articles of manufacture in accordance with the present invention can be prepared which are more or less colorless, depending on the thicknesses of the various films employed to form the coating. In particular, increasing the thickness of one or more of the anti-reflection oxide layers and/or decreasing the thickness of the silver infra-red reflective layer can be employed to provide a more colorless sample. This is consistent with the discussion in Example 7, above. Correspondingly, a more color-forming article can be prepared by decreasing the thickness of the anti-reflection layers and increasing the silver layer thickness. Additional alternative embodiments of the present invention, including those employing $WO_x$ and the like can be employed in accordance with the principles disclosed here to provide color-forming or colorless coated articles within the scope of the present invention.

We claim:

1. A coated article of manufacture comprising a substantially transparent substrate with a substantially transparent coating on a surface of the substrate, the substantially transparent coating comprising:
   a first anti-reflection layer of dielectric material,
   an infra-red reflective layer of silver metal overlying the anti-reflection dielectric layer,
   a buffer layer selected from silica, silicon, silicon nitride and tungsten nitride materials, directly overlying the infra-red reflective layer of silver metal, and
   a second anti-reflection layer of tungsten oxide overlying the buffer layer.

2. The coated article of manufacture according to claim 1 wherein the first anti-reflection layer of dielectric material is tungsten oxide.

3. The coated article of manufacture according to claim 2 wherein the first anti-reflection layer of tungsten oxide and the second anti-reflection layer of tungsten oxide each has a substantially uniform thickness from 300Å to 450Å.

4. The coated article of manufacture according to claim 1 wherein like coating imparts coloration to the coated article.

5. The coated article of manufacture according to claim 1 wherein at least one of the anti-reflection layers is $WO_x$, where the value of x is from 2.5 to 2.99.

6. The coated article of manufacture according to claim 1 wherein the first anti-reflection layer is an oxide and the second anti-reflection layer is $WO_3$.

7. The coated article of manufacture according to claim 1 wherein the first anti-reflection layer is $WO_3$ and the second anti-reflection layer is $WO_3$.

8. The coated article of manufacture according to claim 1 wherein the first anti-reflection layer an oxide and the second anti-reflection layer is $WO_x$, where x is from 2.5 to 2.99.

9. The coated article of manufacture according to claim 1 wherein the first anti-reflection layer lies directly on the surface of the substrate.

10. The coated article of manufacture according to claim 1 wherein the infra-red reflective layer of silver metal directly overlies the first anti-reflection layer of dielectric material.

11. The coated article of manufacture according to claim 1 wherein the buffer layer comprises silicon.

12. The coated article of manufacture according to claim 11 wherein the infra-red reflective layer of silver metal has a thickness between 80Å and 130Å and the buffer layer has a thickness between 25Å and 50Å.

13. The coated article of manufacture according to claim 1 wherein the second anti-reflection layer of tungsten oxide directly overlies the buffer layer.

14. The coated article of manufacture according to claim 1 wherein the substantially transparent substrate is a glass panel.

15. The coated article of manufacture according to claim 1 wherein the substantially transparent substrate is a glass panel of soda-lime-silica glass.

16. The coated article of manufacture according to claim 1 further comprising a color control layer lying between the first anti-reflection layer and the surface of the substrate.

17. The coated article of manufacture according to claim 16 wherein the color control layer has a thickness less than 50Å and comprises material selected from silicon and tungsten.

18. A coated article of manufacture comprising a substantially transparent substrate with a substantially transparent coating on a surface of the substrate, the substantially transparent coating comprising:

a first anti-reflection layer of dielectric material, an infra-red reflective layer of silver metal overlying the anti-reflection dielectric layer, a buffer layer directly overlying the infra-red reflective layer of silver metal, and a second anti-reflection layer of tungsten oxide overlying the buffer layer wherein the first anti-reflection layer of dielectric material is tungsten oxide.

the first anti-reflection layer of tungsten oxide and the second anti-reflection layer of tungsten oxide each has a substantially uniform thickness from 300Å to 450Å, and the thickness of the first anti-reflection layer of tungsten oxide is from 6% to 12% less than the thickness of the second anti-reflection layer of tungsten oxide.

19. A coated article of manufacture comprising a substantially transparent substrate with a substantially transparent coating on a surface of the substrate, the substantially transparent coating comprising:

a first anti-reflection layer of dielectric material, an infra-red reflective layer of silver metal overlying the anti-reflection dielectric layer, a buffer layer directly overlying the infra-red reflective layer of silver metal and a second anti-reflection layer of tungsten oxide overlying the buffer layer, wherein the first anti-reflection layer is $WO_x$, where x is from 2.5 to 2.99 and the second anti-reflection layer is $WO_3$.

20. A coated article of manufacture comprising a substantially transparent substrate with a substantially transparent coating on a surface of the substrate, the substantially transparent coating comprising:

a first anti-reflection layer of dielectric material, an infra-red reflective layer of silver metal overlying the anti-reflection dielectric layer, a buffer layer directly overlying the infra-red reflective layer of silver metal, and a second anti-reflection layer of tungsten oxide overlying the buffer layer, wherein the first anti-reflection layer is $WO_x$ and the second anti-reflection layer is $WO_x$, where x is independently in each instance from 2.5 to 2.99.

21. A coated article of manufacture comprising a substantially transparent substrate with a substantially transparent coating on a surface of the substrate, the substantially transparent coating comprising:

a first anti-reflection layer of dielectric material, an infra-red reflective layer of silver metal overlying the anti-reflection dielectric layer, a buffer layer directly overlying the infra-red reflective layer of silver metal, and a second anti-reflection layer of tungsten oxide overlying the buffer layer wherein the first anti-reflection layer is $WO_3$ and the second anti-reflection layer is $WO_x$, where x is from 2.5 to 2.99.

22. A coated article of manufacture comprising a substantially transparent substrate with a substantially transparent coating on a surface of the substrate, the substantially transparent coating comprising:

a first anti-reflection layer of dielectric material, an infra-red reflective layer of silver metal overlying the anti-reflection dielectric layer, a buffer layer directly overlying the infra-red reflective layer of silver metal, and a second anti-reflection layer of tungsten oxide overlying the buffer layer, and inner buffer layer positioned between the first anti-reflection layer and the infra-red reflective layer of silver metal.

23. The coated article of manufacture according to claim 22 wherein the inner buffer layer comprises silicon.

24. A coated article of manufacture comprising a substantially transparent substrate with a substantially transparent coating on a surface of the substrate the substantially transparent coating comprising:

a first anti-reflection layer of dielectric material, an infra-red reflective layer of silver metal overlying the anti-reflection dielectric layer, a buffer layer directly overlying the infra-red reflective layer of silver metal, and a second anti-reflection layer of tungsten oxide overlying the buffer layer, a second infra-red reflective layer of silver metal overlying the second anti-reflection layer of tungsten oxide, a second buffer layer directly overlying the second infra-red reflective layer of silver metal, and a third anti-reflection layer of tungsten oxide overlying the second buffer layer.

25. A glazing unit having normal emissivity not greater than 0.01 and comprising a substantially transparent substrate with a substantially transparent coating on a surface of the substrate, the substantially transparent coating comprising:
- a first anti-reflection layer of dielectric material,
- an infra-red reflective layer of silver metal overlying the anti-reflection dielectric layer,
- a buffer layer directly overlying the infra-red reflective layer of silver metal, and
- a second anti-reflection layer of tungsten oxide overlying the buffer layer.

26. An electrically conductive panel comprising a substantially transparent substrate with a substantially transparent coating on a surface of the substrate, the substantially transparent coating comprising:
- a first anti-reflection layer of dielectric material,
- an infra-red reflective layer of silver metal overlying the anti-reflection dielectric layer, a buffer layer directly overlying the infra-red reflective layer of silver metal, wherein the buffer layer comprises material selected from silica, silicon, silicon nitride and tungsten nitride materials, and
- a second anti-reflection layer of tungsten oxide overlying the buffer layer.

27. A method of manufacturing a coated article comprising:
  providing a substantially transparent substrate; and
  forming a substantially transparent coating on a surface of the substrate by:
  A) depositing a first anti-reflection layer of dielectric material,
  B) subsequently depositing silver metal over the anti-reflection dielectric layer to form an anti-reflection layer,
  C) subsequently depositing a buffer layer directly onto the infra-red reflective layer, wherein the buffer layer comprises material selected from silica, silicon, silicon nitride and tungsten nitride materials, and
  D) subsequently depositing tungsten oxide over the buffer layer to form a second anti-reflection layer.

28. The method of manufacturing a coated article according to claim 27 wherein the first anti-reflection layer of dielectric material is tungsten oxide.

29. The method of manufacturing a coated article according to claim 27 wherein the first anti-reflection layer is deposited directly onto the surface of the substrate.

30. The method of manufacturing a coated article according to claim 27 wherein the infra-red reflective layer is deposited directly onto the first anti-reflection layer of dielectric material by sputtering silver metal in a non-reactive atmosphere.

31. A method of manufacturing a coated article comprising:
  providing a substantially transparent substrate; and
  forming a substantially transparent coating on a surface of the substrate by:
  A) depositing a first anti-reflection layer of dielectric material,
  B) subsequently depositing silver metal over the anti-reflection dielectric layer to form an anti-reflection layer,
  C) subsequently depositing a buffer layer directly onto the infra-red reflective layer, and
  D) subsequently depositing tungsten oxide over the buffer layer to form a second anti-reflection layer,
  wherein the step of depositing the buffer layer comprises sputtering silicon from a doped silicon target in a non-reactive atmosphere directly onto the infra-red reflective layer.

32. The method of manufacturing a coated article according to claim 1 wherein the second anti-reflection layer of tungsten oxide is deposited directly onto the buffer layer by sputtering tungsten metal in an atmosphere comprising oxygen.

33. A method of manufacturing a coated article comprising:
  providing a substantially transparent substrate; and
  forming a substantially transparent coating on a surface of the substrate by:
  A) depositing a first anti-reflection layer of dielectric material,
  B) subsequently depositing silver metal over the anti-reflection dielectric layer to form an anti-reflection layer,
  C) subsequently depositing a buffer layer directly onto the infra-red reflective layer, and
  D) subsequently depositing tungsten oxide over the buffer layer to form a second anti-reflection layer,
  and further comprising, between step (A) and step (B), the step of depositing an inner buffer layer over the first anti-reflection layer.

34. A method of manufacturing a coated article comprising:
  providing a substantially transparent substrate; and
  forming a substantially transparent coating on a surface of the substrate by:
  A) depositing a first anti-reflection layer of dielectric material,
  B) subsequently depositing silver metal over the anti-reflection dielectric layer to form an anti-reflection layer,
  C) subsequently depositing a buffer layer directly onto the infra-red reflective layer, and
  D) subsequently depositing tungsten oxide over the buffer layer to form a second anti-reflection layer,
  and further comprising, prior to step (A), the step of depositing a color control layer over the surface of the substrate.

35. The method of manufacturing a coated article according to claim 34 wherein the step of depositing the color control layer comprises sputtering a material selected from silicon and tungsten to a thickness less than 50Å.

36. The method of manufacturing a coated article according to claim 27 further comprising, prior to step (A), the steps of washing and substantially drying the surface of the substrate.

37. A method of manufacturing a coated article comprising:
  providing a substantially transparent substrate; and
  forming a substantially transparent coating on a surface of the substrate by:
  A) depositing a first anti-reflection layer of dielectric material,
  B) subsequently depositing silver metal over the anti-reflection dielectric layer to form an anti-reflection layer,
  C) subsequently depositing a buffer layer directly onto the infra-red reflective layer, and
  D) subsequently depositing tungsten oxide over the buffer layer to form a second anti-reflection layer,
  and further comprising, subsequent to step (D), the steps of:
  depositing tungsten oxide onto the second anti-reflection layer;

subsequently depositing silver metal to form a second infra-red reflective layer; subsequently depositing a second buffer layer directly overlying the second infra-red reflective layer; and subsequently depositing a third anti-reflection layer of tungsten oxide over the second buffer layer.

38. A method of manufacturing a coated article comprising the steps of:

providing a substantially transparent substrate; and forming a substantially transparent coating on a surface of the substrate by passing the substrate through a multi-station sputtering chamber, with continuous travel of the substrate through the chamber from station to station, including:
- A) depositing a first anti-reflection-layer of tungsten oxide directly onto the surface of the substrate by sputtering tungsten metal in an atmosphere comprising oxygen at a first station of the multi-station chamber;
- B) subsequently depositing silver metal over the anti-reflection dielectric layer to form an anti-reflection layer by sputtering silver metal in a substantially inert atmosphere at a subsequent station of the multi-station chamber;
- C) subsequently depositing-a buffer layer directly onto the infra-red reflective layer by sputtering silicon in a substantially inert atmosphere at a subsequent station of the multi-station chamber; and
- D) subsequently depositing tungsten oxide over the buffer layer to form a second anti-reflection layer by sputtering tungsten metal in an atmosphere comprising oxygen at a subsequent station of the multi-station chamber.

39. The method of manufacturing a coated article according to claim 38 wherein the substantially transparent substrate is soda-lime-silica glass and the method further comprises, subsequent to step (D), tempering the substrate.

40. The method of manufacturing a coated article according to claim 39 further comprising:

depositing a first protective layer over the substrate surface prior to depositing the first anti-reflection layer; and depositing a second protective layer over the second anti-reflection layer, wherein the first and second protective layers each is formed of material selected from silicon and tungsten.

* * * * *

UNITED STATES PATENT AND TRADEMARK OFFICE
CERTIFICATE OF CORRECTION

PATENT NO.    : 6,040,939
DATED         : March 21, 2000
INVENTOR(S)   : Hulya Demiryont et al.

It is certified that error appears in the above-identified patent and that said Letters Patent is hereby corrected as shown below:

<u>Column 23,</u>
Lines 60-61, replace "anti-reflection" with -- infra-red reflective --

<u>Column 24,</u>
Line 4, replace "1" with -- 31 --

Signed and Sealed this

Fourth Day of June, 2002

*Attest:*

*Attesting Officer*

JAMES E. ROGAN
*Director of the United States Patent and Trademark Office*

UNITED STATES PATENT AND TRADEMARK OFFICE
CERTIFICATE OF CORRECTION

PATENT NO.    : 6,040,939
DATED         : March 21, 2000
INVENTOR(S)   : Hulya Demiryont et al.

It is certified that error appears in the above-identified patent and that said Letters Patent is hereby corrected as shown below:

Column 24,
Lines 16, 33 and 58, replace "anti-reflection layer" with -- infra-red reflective layer --

Column 25,
Line 21, replace "anti-reflection layer" with -- infra-red reflective layer --

Signed and Sealed this

Fifth Day of August, 2003

JAMES E. ROGAN
*Director of the United States Patent and Trademark Office*